(12) United States Patent
Smith et al.

(10) Patent No.: US 7,686,211 B2
(45) Date of Patent: **\*Mar. 30, 2010**

(54) AUTOMATED BANKING MACHINE SYSTEM AND METHOD

(75) Inventors: Mark D. Smith, North Canton, OH (US); Atta Mateen, Minnetonka, MN (US); David E. Kolinski-Schultz, Canton, OH (US); Dale H. Blackson, Canton, OH (US); Natarajan Ramachandran, Uniontown, OH (US)

(73) Assignee: Diebold Self-Service Systems division of Diebold, Incorporated, North Canton, OH (US)

( \* ) Notice: Subject to any disclaimer, the term of this patent is extended or adjusted under 35 U.S.C. 154(b) by 0 days.

This patent is subject to a terminal disclaimer.

(21) Appl. No.: 12/229,317

(22) Filed: Aug. 21, 2008

(65) Prior Publication Data

US 2009/0057397 A1 Mar. 5, 2009

Related U.S. Application Data

(63) Continuation of application No. 11/732,370, filed on Apr. 3, 2007, now Pat. No. 7,416,112.

(60) Provisional application No. 60/795,721, filed on Apr. 28, 2006, provisional application No. 60/789,644, filed on Apr. 5, 2006.

(51) Int. Cl.
*G06Q 40/00* (2006.01)
*G07D 11/00* (2006.01)
*G07F 19/00* (2006.01)

(52) U.S. Cl. .......................... 235/379; 235/375; 705/43; 705/45

(58) Field of Classification Search ................. 235/379, 235/375, 381; 705/35, 39, 42–45
See application file for complete search history.

(56) References Cited

U.S. PATENT DOCUMENTS

| | | | |
|---|---|---|---|
| 5,952,639 A | 9/1999 | Ohki | |
| 6,308,887 B1 * | 10/2001 | Korman et al. | ............... 235/379 |
| 6,464,134 B1 | 10/2002 | Page | |
| 7,028,886 B1 | 4/2006 | Maloney | |
| 7,140,539 B1 * | 11/2006 | Crews et al. | ................. 235/379 |
| 2003/0023555 A1 * | 1/2003 | Rees | ........................... 705/44 |

\* cited by examiner

*Primary Examiner*—Edwyn Labaze
(74) *Attorney, Agent, or Firm*—Ralph E. Jocke; Daniel D. Wasil; Walker & Jocke

(57) ABSTRACT

A card actuated automated banking machine (152, 198, 200) includes a plurality of transaction function devices. The transaction function devices include a card reader (170), a printer (174), a bill dispenser (176), a coin dispenser (178), a display (182), a check imaging device (186) and at least one processor (190). The automated banking machine is operative responsive to receiving a check and certification data to dispense cash in exchange for the check. The person presenting the check need not provide user identifying inputs through input devices in order to receive cash for the check. A check recipient prior to presenting the check for payment is also enabled to verify that the check will be paid through communication with at least one computer (204) through at least one consumer interface device (208).

34 Claims, 15 Drawing Sheets

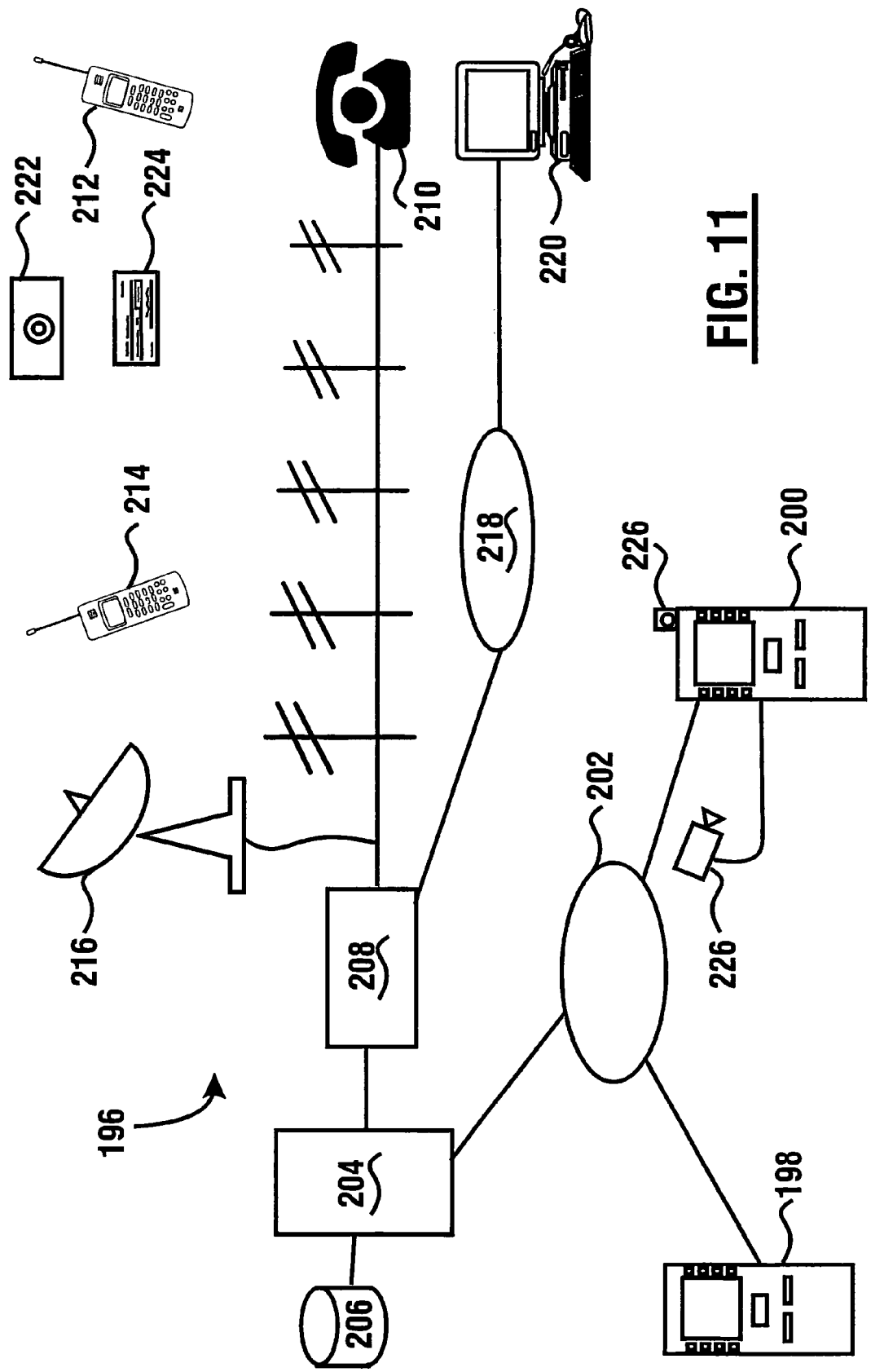

AUTOMATED BANKING MACHINE SYSTEM AND METHOD

CROSS REFERENCE TO RELATED APPLICATIONS

This application is a continuation application of U.S. Ser. No. 11/732,370 filed Apr. 3, 2007. Ser. No. 11/732,370 claims benefit of Provisional Application Ser. No. 60/789,644 filed Apr. 5, 2006. This application also claims benefit pursuant to 35 U.S.C. §119(e) of Provisional Application Ser. No. 60/795,721 filed Apr. 28, 2006. The disclosures of each of these applications are incorporated herein by reference.

TECHNICAL FIELD

This invention relates to automated banking machines that are actuated responsive to indicia on cards carried by users which may be classified in U.S. Class 235, Subclass 379. The exemplary automated banking machine is used in a system that enables a user to cash a check at an automated banking machine.

BACKGROUND ART

Automated banking machines actuated responsive to user cards are known in the prior art. For purposes of this disclosure an automated banking machine, automated teller machine, ATM or automated transaction machine shall include any device which is capable of carrying out transactions including transfers of value. Furthermore, it should be understood that for purposes of this disclosure the terms cash and currency are interchangeable. Automated banking machines are typically operative to perform banking transactions such as dispensing cash, transferring value between banking accounts, or accepting deposits. Many automated banking machines are located in retail or service facilities such as stores, gas stations, restaurants and bars. The owners of these facilities often generate income from the automated banking machines through service fees on transactions performed with the machine. For example, if a user withdraws an amount of cash from the automated banking machine, the user may be charged a small transaction fee.

If the automated banking machine has only marginal use, the income generated may not be sufficient to justify the expense of maintaining the machine. For example, maintenance and service costs may consume a large portion of the monthly income generated by an automated banking machine which has low transaction volumes.

Alternative embodiments of systems that include automated banking machines may benefit from improved check cashing capabilities. For example, while some automated banking machines provide the capabilities for a user to deposit and/or cash a check, such capabilities are generally limited to persons who have an account such as a checking account and a debit card that will enable operation of the automated banking machine. Persons who may receive checks and who do not have an account and card that can operate the automated banking machine, or who do not wish to use such a card or account, are generally not able to cash a check at an automated banking machine.

DISCLOSURE OF INVENTION

It would be desirable to provide additional functions and capabilities for automated banking machines. Digital recordings are typically distributed on compact disks (CD) for playback on a CD player. As sound system capabilities have become a standard feature of many new personal computers, digital sound recordings are also being distributed as computer files. Common formats for sound computer files include WAV (Waveform Audio File Format) and MP3 (MPEG-1 Audio Layer-3). To play such files, computer systems can employ a sound file player application such as the Windows Media Player from Microsoft Corporation. Sound file player applications read the digital sound files and output corresponding music through the sound card and speakers of the computer system.

Digital sound recordings may also be copied directly from an audio CD using a personal computer through a process called "ripping." Essentially ripping refers to the reading of the digital information that represents audio on the CD and saving the information in a computer readable sound file. Different formats of sound files have different characteristics. For example WAV files are typically uncompressed digital versions of sampled sound. MP3 files are typically created by compressing a sound sequence into a very small file (about one-twelfth the size of a corresponding WAV file). However, MP3 files are "lossy" meaning that the compression algorithms remove digital information that most people cannot hear or cannot distinguish from other sounds. If a high sampling rate is used to generate the MP3 files, the sound quality is only slightly inferior to that of the original audio file. However, the advantage of the smaller size of the MP3 files is significant. These advantages include the ability to store more hours of sound recordings per amount of space in physical storage mediums such as, for example, hard disks, RAM, and flash memory cards. Also, the smaller size of MP3 files enables them to be downloaded much faster through a network such as the Internet.

Numerous web sites on the Internet offer digital sound files such as MP3 files for downloading to a personal computer. Also as a result of the popularity of digital sound files, portable computer systems have been developed such as the iPod and the Diamond RIO which are specifically designed to load and play sound recording files.

Unfortunately, the technology associated with creating MP3 files from a CD and downloading MP3 files from web sites has resulted in a significant amount of music piracy and lost revenues for artists and music recording companies. Anyone with a home PC can generate an unlimited number of copies of digital sound files. By placing such pirated files on an Internet web site, unlimited distribution of pirated sound files is possible.

To deter copyright infringement and unrestricted piracy of digital sound recordings, the music industry considered alternative file formats for storing digital recordings called SDMI (Secure Digital Music Initiative). The SDMI specification for sound files offered similar compression characteristics as the MP3 file format; however, SDMI is designed to have built in copyright protection features which limit the playback and duplication of the files. In addition Microsoft has developed an alternative specification for compressing and copyright protecting sound files called Windows Media.

Because MP3 files are already widely accepted as the de facto standard, it may be very difficult for new file formats to replace MP3. The popularity of MP3 files coupled with unlimited sound file piracy may significantly decrease the revenue that recording labels and artists generate from the sale of music and other forms of audio. Exemplary forms of certain innovations described herein provide a system of distributing MP3 files that enables the copyright holder to receive licensing fees for each distribution of an MP3 file.

Distribution of sound recordings from the Internet makes it much easier for an individual artist to reach a mass audience for their work without a recording label. As a result the variety of music that is available over the Internet is exploding. Many of the titles can be downloaded without a fee. Unfortunately much of the music that has no fee is low quality, amateurish, and not very desirable. If the artist is relatively unknown, it is very difficult to get users to download music for a fee. This is because most individuals are hesitant to pay for downloaded MP3 files before being familiar with the artist.

If the music is given away on a no-fee basis or even a low-fee preview basis, it may be difficult to generate any income from the music. Once the MP3 version of the music is downloaded, the MP3 file can be played, copied, and distributed an unlimited number of times without generating income for the artist. Exemplary forms of certain innovations described herein provide a system that enables individuals to test out songs for a small fee, but does not enable the users to copy or distribute the sound files.

To take advantage of the benefits of playing sound recording files rather than CDs or cassettes, a user must have a PC. Although the cost of a personal computer has dramatically decreased over the last two decades, computers are still significantly more expensive than a CD player. Portable sound file players such as the iPod and the Diamond RIO are operative to play music independently from a PC; however they still must be connected to a PC at some point to upload a new set of MP3 files. Consequently there exists a need for a new system of ordering goods online, such as sound files, that does not require the user to have a computer.

The current methods for delivery of forms of audio, visual, print and other media may also have drawbacks. Exemplary forms of certain innovations described herein provide for a better way of delivering the content of such media.

Current methods and devices enabling persons to purchase goods, services or other items also have limitations. Exemplary forms of the innovations described herein enable persons to purchase and/or to pay for goods, services or other items through the use of automated banking machines.

Gaming establishments may also benefit from having automated banking machines with features that facilitate users obtaining items that can be used to operate gaming machines and/or that can be used to dispense winnings to users of gaming machines.

In view of the foregoing the innovations described in detail herein are intended to address at least some of the following objectives.

It is an object of exemplary embodiments to provide an automated banking machine that is actuated in response to data on user cards, which carries out transactions including the dispensing of cash, and which is capable of providing added functions which increase usage thereof.

It is a further object of exemplary embodiments to provide an automated banking machine that is operative to enable a user thereof, to order or to pay for goods through a private network or public network such as the Internet.

It is a further object of an exemplary embodiment to provide an automated banking machine that is operative to dispense digital information.

It is a further object of exemplary embodiments to provide an automated banking machine that is operative to dispense digital information to a portable storage medium.

It is a further object of exemplary embodiments to provide an automated banking machine that is operative to dispense digital information to a portable computing system.

It is a further object of exemplary embodiments to provide an automated banking machine that is operative to dispense digital information in exchange for a user fee.

It is a further object of exemplary embodiments to provide an automated banking machine that is operative to output digital information to an output device in exchange for a user fee.

It is a further object of exemplary embodiments to provide an automated banking machine that is operative to distribute user fee income generated from the dispense of digital information among a plurality of entities.

It is a further object of exemplary embodiments to provide an automated banking machine that is operative to download digital information from a digital information source located on a network.

It is a further object of exemplary embodiments to provide an automated banking machine that is operative to dispense digital sound recordings.

It is a further object of exemplary embodiments to provide an automated banking machine that is operative to play digital sound recordings through a sound system.

It is a further object of exemplary embodiments to provide an automated banking machine that is operative to dispense digital sound recordings onto a portable storage medium.

It is a further object of exemplary embodiments to provide an automated banking machine that is operative to dispense digital sound recordings to a portable digital sound file player.

It is a further object of exemplary embodiments to provide an automated banking machine that is operative to charge an account of a user in exchange for the playing of digital sound recordings.

It is a further object of exemplary embodiments to provide an automated banking machine that is operative to provide a selection of digital sound recordings to play when the user performs a banking or other transaction at the machine.

It is a further object of exemplary embodiments to provide an automated banking machine that is operative to offer a selection of digital sound recordings to play that are downloaded from a network such as the Internet.

It is a further object of exemplary embodiments to provide a system and method through which an automated transaction machine may be used to deliver and manipulate image content.

It is a further object of exemplary embodiments to provide a system in which purchasers of goods can pay for goods ordered elsewhere through operation of an automated banking machine.

It is a further object of exemplary embodiments to provide a system and method enabling use of an automated banking machine to acquire goods in the form of gift certificates that can be redeemed by certain affiliated merchants.

It is a further object of exemplary embodiments to provide an automated banking machine that can dispense and/or redeem for cash, items which can be used to operate gaming machines.

It is a further object of exemplary embodiments to provide an automated banking machine that can carry out transactions through an accrued value processing network as well as through a banking transaction network.

It is a further object of an exemplary embodiment to provide an automated banking machine that can cash checks for users without the user having to provide inputs that personally identify the user to the machine.

It is a further object of an exemplary embodiment to provide an automated banking machine and system that enables a person to receive a check and verify prior to presenting the check that the check will be exchanged for cash at an automated banking machine or elsewhere.

Further objects of exemplary embodiments will be made apparent in the following Best Modes for Carrying Out Invention and the appended claims.

The foregoing objects are accomplished in some exemplary embodiments by an automated banking machine that is operative to permit a user thereof to remotely purchase goods. The goods may be delivered physically, such as by mail, or electronically, such as digitally. For example, the purchase may include the dispense of digital information which is also referred to herein as digital content. In the exemplary embodiment the digital information may include digital sound recording files that may be output through an output device such as a sound system in operative connection with the banking machine. However in alternative embodiments, the digital information may include other types of information that may be digitally stored and transported over a network. Other examples of digital information include digital representations of images, books, software, audiovisual works, movies, TV shows, magazines, newspapers, games, compilations, and databases. Of course it should be understood that in some embodiments digital and/or non digital goods may be physically delivered, such as by for example USPS, UPS, or FedEx, or by being provided by a service provider or other merchant.

An exemplary automated banking machine is in operative connection with storage read/write devices such as a floppy disk drive, smart card drive, flash memory drive, or any other device that is operative to read and write information to a portable storage medium. In the exemplary embodiment the automated banking machine is operative to save digital information such as digital sound recording files to the portable medium.

Alternative embodiments of the automated banking machine may include a portable computing device communication ports that are operative to communicate with a portable computing device. When a portable computing device, such as a laptop computer, hand-held computer, or sound file player is placed in operative connection with the communication port, the automated banking machine is operative to send digital information such as digital sound recording files to the portable computing device. Examples of communication ports that are operative for use with embodiments include a Universal Serial Bus (USB) port, parallel port, RS-232 Serial Port, Infrared (IR) Port, Radio Frequency (RF) port, or any other type of physical or wireless communication port.

An exemplary automated banking machine may be operatively programmed to assess a fee from a user in exchange for its use in purchasing goods, such as outputting either digital information or saving digital information to a portable storage medium or portable computing device. For automated banking machines that include a card reader and are in operative connection with a host banking system, the automated banking machine may be operative to charge the fee to an account associated with a credit card, debit card, or smart card for example. For automated banking machines that include a currency accepting device, the machine may be operative to accept currency in exchange for a goods order, such as outputting or saving digital information.

In an exemplary embodiment, an automated banking machine is in operative connection with a private network, virtual private network or public network such as the Internet. For purposes of this description references to a network shall include one or more operatively connected networks. The automated banking machine is programmed to enable a user of the machine to view and select digital information that is downloaded across the network. For example the automated banking machine is operative to display visual outputs corresponding to a plurality of sound recording files such as MP3 files, that can be executed to reproduce individual musical performances such as songs. The exemplary automated banking machine is further operative to download one or more of these sound files in exchange for a fee and to either play the song through a sound system or send the song to a portable storage medium or computing device.

In alternative embodiments, the automated banking machine may be operative to periodically download a selection of digital information in response to programmed instructions to acquire one or more categories of digital information. By pre-downloading and storing digital information, the machine does not need to be continually connected to a source of digital information. Also any delay caused by having to download individually selected information files across a network is eliminated because the files are stored locally in the automated banking machine.

For example when the digital information corresponds to sound recording files, the automated banking machine may be operative to periodically download sound files that correspond to the most popular songs for the week or other time period. In another example if the digital information corresponds to digital books, the machine may be operative to periodically download digital books that correspond to a fiction or nonfiction best seller list or ranking. In another example if the digital information corresponds to broadcast TV shows, the banking machine may be operative to periodically download digital files that correspond to the TV shows that were broadcast over a certain time period. Of course in other embodiments other types of digital information may be delivered and stored in the machine for delivery to users, or downloaded at the time in response to the user's request.

In an exemplary embodiment, the automated banking machine may be operative to distribute the user fees for the dispense of digital information among a plurality of entities, including the owner of the machine, the source of the digital information, and/or a licensing organization. This distribution may be performed for each user transaction or may be performed on a periodic basis. When the distribution is performed periodically, the banking machine is operative to calculate an amount of value that corresponds to licensing fees for digital information that is downloaded or dispensed by the banking machine during a time period. An amount of value equal to this calculated amount may then be transferred from an account associated with the banking machine such as the operator thereof to the source(s) of the digital information and/or to licensing organizations.

When the digital information requires copy protection features, the automated banking machine may be further operative to include or activate a copy protection feature responsive to the type of license being purchased by the user. For example, if the banking machine dispenses SDMI or Windows Media sound recording files, the banking machine may be operative to configure the files to limit where and how long the sound files can be played as well as whether duplication is allowed.

Alternative exemplary embodiments provide for the delivery and manipulation of image files through an automated banking machine. In some such embodiments the machine may include a photographic quality printer and a user may selectively manipulate and/or print image files from a local source such as storage media or a digital camera, or a remote source such as a server associated with a film processor.

Alternative exemplary embodiments provide not only for the purchase of tangible goods or digital goods, but service-based goods. For example, an automated banking machine may enable a user to access web sites that require a fee for their use, such as Internet gaming or other gaming facilities. Exemplary embodiments may enable a user to order goods and pay for such goods at the machine. Alternative embodiments may enable a user to pay at the machine for goods ordered elsewhere. Alternative embodiments may enable a user to acquire goods in the form of redeemable certificates that are redeemable for other types of goods or services.

In still other embodiments, an automated banking machine may include a code reading device. The code reading device is operative to read items produced and/or accepted by gaming machines. The automated banking machine is operative to communicate with at least one banking network to enable users to conduct banking transactions. The banking machine is also operative to communicate with a computer that is included in an accrued gaming value processing network that extends within a gaming establishment where the machine is located.

In an exemplary embodiment, gaming machines in the establishment accept non-cash items representative of value. These items may include tickets having machine readable indicia such as bar codes thereon. Of course, other types of items with other types of machine readable indicia may be used in other embodiments. The items representative of value when accepted by the gaming machines enable the user presenting the items to play one or more games of the type provided by the machine. The gaming machines are also operative to produce items representative of value that include machine readable indicia. This value may correspond to winnings that the user has accrued as a result of playing the game. These items may also be representative of value that a user has remaining after having played the game. In some exemplary embodiments, the item may include a ticket printed by the gaming machine, which ticket includes machine readable indicia. In some alternative embodiments, the item may include the original item presented to the gaming machine by the user that has machine readable indicia thereon, which indicia has been modified to correspond to additions or deductions that have resulted from playing games at the gaming machine.

In some exemplary embodiments, the item representative of value may be taken to a plurality of different gaming machines in the establishment. The item may be redeemed for plays of a game, and a new item issued or modified based on the value associated with the user's winnings or losses at the particular machine.

In some exemplary embodiments, each of the gaming machines is operatively connected to at least one computer. Through the accrued value processing network in the gaming establishment, communications between the gaming machines and the at least one computer track the values associated with each of the items which are redeemed and issued through operation of the gaming machines. In this way, the computer in the accrued value processing network is able to keep track of each item in circulation in the gaming establishment, and the corresponding value associated therewith. The at least one computer in the accrued value processing network is also operative to keep track of the machine readable indicia on each item, and associate such indicia with the value currently corresponding thereto.

The automated banking machine is in operative communication through a communication device of the machine, with the accrued value processing network. When a user in possession of a ticket or other non-cash item no longer desires to operate further gaming machines within the establishment, the user may take his ticket and present it to the automated banking machine. A code reader in supporting connection with the housing of the machine accepts the ticket and reads the machine readable indicia thereon. Responsive to such machine readable indicia, the machine is operative to communicate through the accrued value processing network with the at least one computer in the gaming establishment. The at least one computer is operative to determine the value associated with the machine readable indicia on the item that has been presented to the automated banking machine. The machine is then operative, responsive to communication with the at least one computer in the gaming establishment, to cause bills and/or coin to be dispensed from the machine to the user in an amount corresponding to the value associated with the machine readable indicia on the ticket. In this way, a user is enabled to receive cash which corresponds to the user's winnings or remaining value associated with the item that has been provided to the user by the gaming machine. Of course it should be understood that, while the exemplary embodiment has been described with respect to tickets, the principles may also be applied to items which store data which is modified including, for example, tokens, radio frequency identification (RFID) tags, smart cards, flash memory cards, cell phones or other such items.

In still other exemplary embodiments, an automated banking machine in the gaming establishment may be programmed so that at least one processor therein is operative to enable a user to transfer funds from a banking account accessed through a banking network, and to receive a ticket or other item that can be used within the gaming establishment to operate the gaming machines. In such embodiments, the automated banking machine communicates with the banking network to debit a user's account. This can be done in response to data included on a customer's card and/or a PIN number input to the banking machine or other values which enable a user to access the user's account and receive value therefrom. The automated banking machine of the exemplary embodiment is then operative to cause a printer in the machine to print a ticket including bar code or other machine readable indicia that corresponds to the value that the user has deducted from the user's account. In addition, the automated banking machine communicates through the accrued value processing network to cause the at least one computer in the gaming establishment to create at least one record corresponding to the item produced by the machine, and the machine readable indica included thereon.

Thereafter in an exemplary embodiment the user may take the ticket or other item produced by the automated banking machine, and use it to play at least one game at a gaming machine within the gaming establishment. Eventually the user may return to the automated banking machine with an item bearing machine readable indicia issued by or modified by a gaming machine. The user may then present the item to the automated banking machine, where it is read by the code reading device. The automated banking machine is then operative, responsive to the machine readable indicia included on the item read by the code reader, to cause the machine to communicate through the accrued value processing network and access the account corresponding to the machine readable indicia. Responsive to such communication, the machine is operative to dispense bills and/or coin to the user in the amount of the value associated with the item that is accepted by the banking machine. Of course the at least one computer in the gaming establishment thereafter eliminates the value associated with the account corresponding to the machine readable indicia, so that no further amount is paid on that particular item.

In still other exemplary embodiments, the automated banking machine may operate in accordance with its programming to enable the user to transfer the value that the user may otherwise be entitled to receive from the accrued value processing network into a banking account of the user through the banking network. In this way, a user can deposit all or a portion of the user's remaining funds or winnings into an account, rather than receive the amount in cash.

In still other alternative embodiments, the automated banking machine may include a check reading device that enables a user of the machine to cash a check through operation of the machine. The automated banking machine may operate in response to indicia included on the check to cause value to be transferred through communication with the banking network. The automated banking machine may operate to issue to the user an item including machine readable indicia that can be used at the gaming machines based on the value of the check. In still other embodiments, the automated banking machine may include a cash accepting device that enables the user to deposit bills into the machine. The automated banking machine may operate in accordance with its programming to accept the bills and issue an item including machine readable indicia that can be used by the user to operate gaming machines in the establishment. In still other embodiments, the automated banking machine may operate to accept bills from the user and issue to the user bills or coin of a different type that a user may find more suitable for the user's intended purposes. This may include, for example, receiving from the user twenty or fifty dollar bills and providing to the user quarters in corresponding amounts that can be accepted by slot machines or other gaming machines in the establishment that accept quarters. In still other embodiments, a cash acceptor on the automated banking machine may operate to accept bills from the user and the machine may be operated to transfer all or some of the accepted funds into a user's bank account accessible through the banking network.

In still other alternative exemplary embodiments, an automated banking machine may be part of a system that enables the cashing of checks by users who do not have cards or other devices that are normally used to conduct transactions at an automated banking machine. In an exemplary embodiment, the maker of a check communicates with at least one computer. Such communication may be accomplished through a consumer interface device such as a telephonic interactive voice response (IVR) device, a text messaging device, a Web interface or other interface. The maker of the check, who is alternatively referred to herein as an account holder, provides inputs that identify them as an account holder as well as inputs identifying the check and the amount of the check. These inputs may be provided, for example, at the time of writing the check, such as through a cell phone, PDA, personal computer or other suitable device. Responsive to the input data from the account holder, at least one financial account computer is operative to determine based on data stored in at least one data store, whether the information validly identifies an account holder and whether the check can be drawn on the account holder's account for the amount indicated. If the at least one computer determines that the data is valid and the check for the amount can be paid, the at least one computer is operative to cause the consumer interface to issue certification data to the maker. The certification data may in some embodiments be in the form of a code that the maker of the check can provide to the recipient of the check. In an exemplary embodiment, the at least one computer is also operative to store in the at least one data store, data corresponding to the check, the check amount, and the certification data. In some exemplary embodiments, the at least one computer is operative to allocate and put a hold on the funds in the check amount so as to assure that there remains a sufficient balance in the account so that the check can be honored.

In an exemplary embodiment, the maker of the check provides the check and the certification data to the recipient who is to be paid with the check. In the exemplary embodiment, the recipient is enabled to verify that the check will be honored. The person receiving the check may contact the entity such as the financial institution associated with the check through a phone, computer or other device. The person receiving the check is enabled to communicate with the at least one computer through the consumer interface device. The recipient of the check in the exemplary embodiment provides data corresponding to the check and the certification data to the at least one computer through the interface device. Responsive to the input of this data, the at least one computer is operative to determine, based on data stored in a data store, whether the check and certification data correspond, as well as the check amount for which the check is assured to be valid. The at least one computer then causes the consumer interface device to output to the person who has received the check an indication of the check amount for which the check will be honored.

Thereafter in an exemplary embodiment, the person who has received the check is enabled to present the check to an automated banking machine. The exemplary automated banking machine enables the holder of the check to operate the machine to conduct the transaction without the need for the person to provide any inputs to the input devices on the machine that personally identify the person presenting the check. This enables the person holding the check to treat the check in a manner similar to cash. The machine also receives the certification data from the user through at least one input device on the machine.

Responsive to receipt of the check and the certification data, the automated banking machine is operative in an exemplary embodiment to produce image data corresponding to a visual image of the check through a check imaging device in the machine. At least one processor in the machine is operative to resolve data from the image data, including data which identifies the check and at least one amount associated with the check. The identifying data may be, for example, data included in a micr line on the check. The resolved amount data may include, for example, a courtesy amount and/or a legal amount on the check. Of course these approaches are exemplary.

The automated banking machine is operative to communicate with the at least one financial account computer. In the exemplary embodiment, the machine communicates to the at least one computer the data identifying the check as well as the certification data. In some embodiments, the machine may also communicate at least one resolved amount which corresponds to an amount that is written on the check. The at least one computer is operative in the exemplary embodiment to determine whether the check identifying data, certification data and amount, correspond to the data stored in at least one data store. Responsive to the data in the data store corresponding to the data received from the automated banking machine, the at least one computer is operative to communicate with the machine in a manner which causes the machine to dispense cash to the user in an amount corresponding to the check amount. In this manner the exemplary embodiment enables a maker to write a check and to certify to the recipient of the check that the check is good for the check amount. In addition, the recipient is enabled to exchange the check for cash without having an account of the type that would normally be necessary to operate an automated banking machine, and without having or to provide inputs that would personally identify a person presenting the check. Of course these approaches are exemplary, and alternative approaches may be used.

BRIEF DESCRIPTION OF DRAWINGS

FIG. 11 is a schematic view of an exemplary banking system which facilitates the cashing of checks for users.

BEST MODES FOR CARRYING OUT INVENTION

Figure 1:
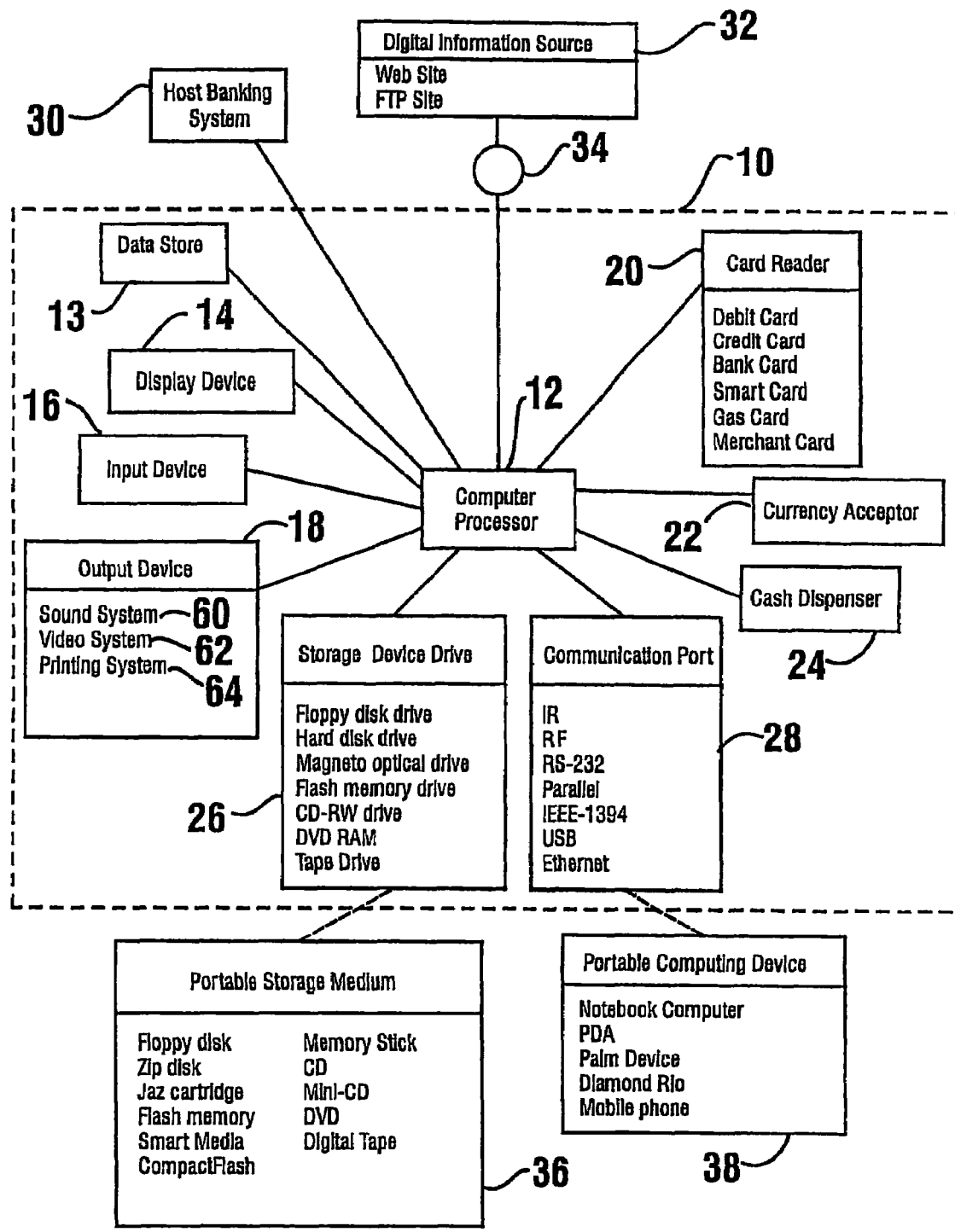
FIG. 1 is a schematic view representative of an exemplary embodiment of an automated banking machine and system that is operative to dispense digital information.

Referring now to the drawings and particularly to FIG. 1, there is shown therein a schematic view of an automated banking machine of an exemplary embodiment generally indicated 10. The automated banking machine of the exemplary embodiment operates responsive to data on user cards. For purposes of brevity the automated banking machine may be referred to herein as an ATM. However, it should be understood that this reference is merely exemplary of automated banking machines which may employ the principles described herein. The ATM 10 includes at least one computer processor 12 referred to alternatively herein as a processor or computer, that is operatively programmed to enable the ATM to perform at least one banking transaction such as the dispense of cash. The computer processor 12 is also operatively programmed to enable the ATM to dispense digital content which is alternatively referred to herein as digital information. To perform these functions the ATM further includes in operative connection with the computer processor 12, at least one data store 13, a display device 14, at least one input device 16, at least one output device 18, a card reader 20 which also serves as an input device, and a cash dispenser 24. The ATM 10 is further operative to communicate through at least one communication device such as a modem, network access card, etc. with at least one financial transaction processing computer which is operative to carry out financial transfers which in this example is host banking system 30. ATM 10 also is enabled to communicate through an appropriate communications device with at least one digital information source 32. In the exemplary embodiment the ATM 10 is operative to download digital information from the digital information source 32 through a network 34 such as the Internet. Exemplary ATMs may have features like those described in U.S. Pat. No. 7,168,613 the disclosure of which is incorporated herein by reference.

It should be understood that the ATM 10 and system are exemplary and in other embodiments automated banking machines may include other or additional devices and may operate in other types of systems. For example, embodiments may include in operative connection with the computer processor 12, a currency acceptor 22, a data store including a storage device drive 26, and a communication port 28 which serves as an output device. The storage device drive 26 serves as a local data store and enables the computer processor to dispense digital information to a portable storage medium 36. The communication port 28 enables the computer processor to cause the dispense of digital information to a portable computing device 38.

Figure 2:
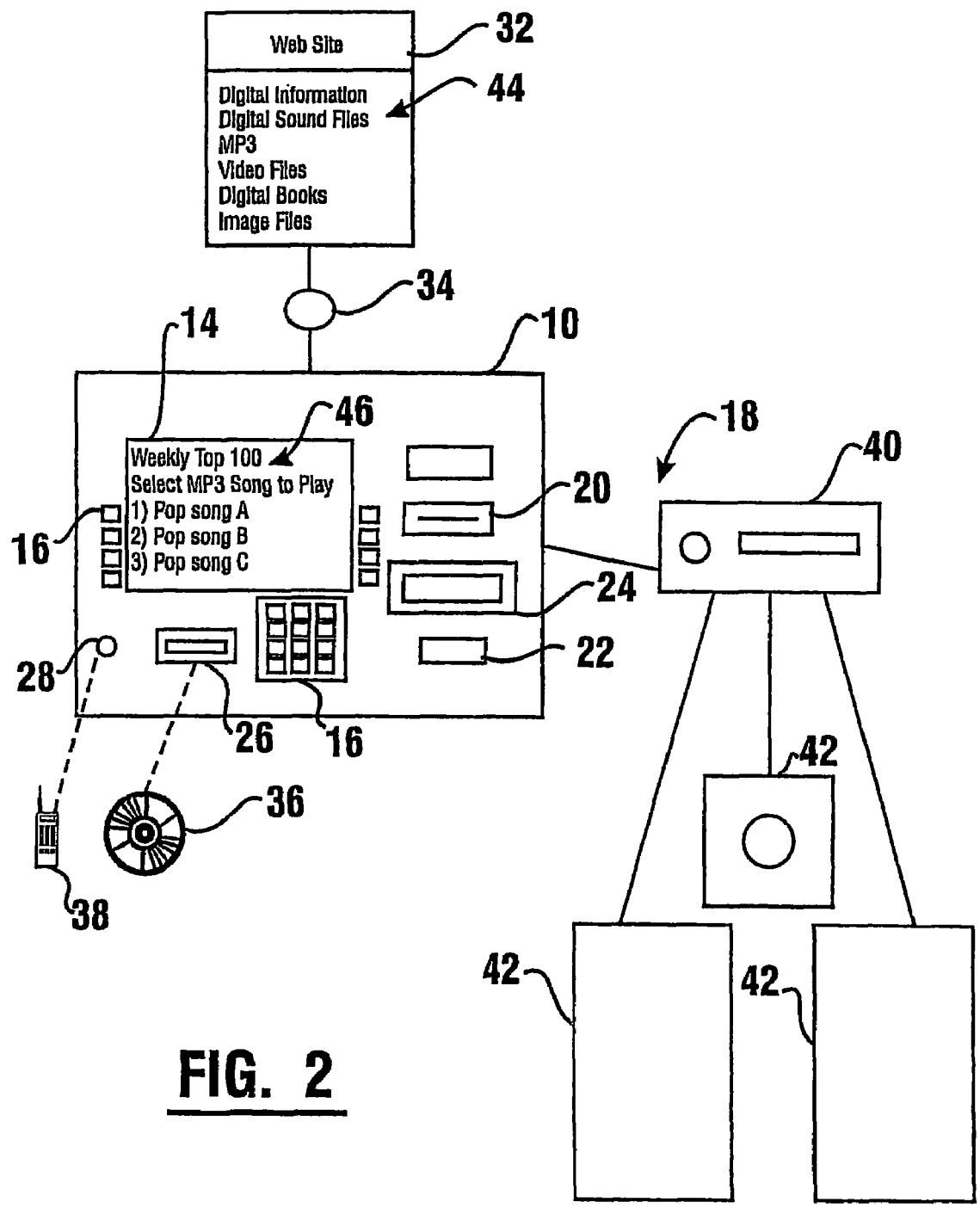
FIG. 2 is a schematic view representative of an exemplary embodiment of an automated banking machine and system that is operative to dispense digital sound recordings.

FIG. 2 schematically shows an exemplary embodiment of the ATM 10 that is operative to dispense both cash and digital content comprising sound recordings such as music and songs. However, it is to be understood that some embodiments may also provide for the dispensing of other types of digital information including digital representations of images, books, software, audiovisual works, movies, TV shows, magazines, newspapers, games, compilations, databases and other types of digital content that may be delivered in a digital format.

Exemplary ATM 10 includes a display device 14 such as a CRT monitor or LCD display. The display device is operative responsive to the processor to output user interface indicia 46. The user interface indicia may include instructional outputs for operating the ATM as well as content indicia which are representative of the portions of digital information that may be dispensed from the ATM for a fee. In some embodiments the content indicia may include listings of songs, movies, books or other portions of the digital content which a user may select to have delivered. Exemplary embodiments may also include graphical representations regarding the information, such as pictures of the artist or CD liner in the case of music files. Audio and/or visual outputs may also be provided to identify, and in some cases enable the user to sample the available information.

Exemplary ATM 10 also includes at least one input device 16 such as a keypad and selection buttons. The input device(s) enable the user to enter operation inputs such as a personal information number (PIN) corresponding to an account, an amount of cash to withdraw, or a selection of a particular digital sound recording or other portion of the digital content to dispense. Although this described embodiment includes function keys and a keypad, alternative embodiments may use other or additional types of input devices for entering information, such as a touch screen device, a speech recognition system, or a track ball.

ATM 10 also includes a cash dispenser 24 and a card reader 20. The card reader 20 is an input device operative to read indicia corresponding to account information from a user's card. The card may be a bank card, credit card, debit card, gas card, merchant card, smart card, or other medium that is operative to store account data and/or other information which may be used to identify a user or their accounts. In some embodiments the ATM may include a biometric type reading device which may identify the user by a characteristic thereof. Such biometric reading devices may include for example a fingerprint reader, iris scanner, retina scanner, voice recognition device, facial recognition reader or other device. The exemplary ATM 10 is operative to dispense a selected amount of cash to the user from the cash dispenser 24, and to debit the account of the user through communication with a financial transaction computer such as a host banking system. The exemplary ATM 10 is also operative to debit user fees from the account for dispensing digital information from the ATM as well.

In alternative embodiments, the ATM may also include at least one currency accepting device 22. For users who do not wish to use an account to pay for the dispense of digital information, the ATM is operative to receive the user fees in the form of cash such as bills and/or coin, using the currency accepting device 22. Currency accepting ATMs may have features like those disclosed in U.S. Pat. Nos. 6,981,638 and/or 6,983,880 the disclosures of which are incorporated herein by reference.

In the exemplary embodiment, the digital information dispensed by the ATM 10 includes digital sound recording files 44. Examples of digital sound recording files include MP3 files, WAV files, SDMI files, and Windows Media files. Each file may correspond to an individual music selection or song. However, sound files may correspond to any collection of sounds of any type and length. Other examples of sound recording files include compilations of songs such as are found on music CDs and spoken textual material corresponding to news articles, stories, speeches and books.

In the exemplary embodiment, the ATM 10 acquires sound files to dispense from at least one remote digital information source 32. The source 32 may include a web site or FTP site accessible through the Internet, or sources in other public or private networks. The exemplary ATM 10 is operative to periodically download a plurality of sound files that match certain customizable programmed criteria. The ATM may also download corresponding graphics or video files associated with the sound files. These downloaded files are stored locally at the ATM in a local content data store 13 such as a hard drive. The ATM 10 is operative to display or output graphical, textual and/or audio content indicia representative of these sound files with the display device 14. A user of the ATM 10 may then provide one or more inputs to select and/or dispense one or more of these sound files.

The ATM may be programmably configured with different types of downloading criteria. For example, if the ATM is located in a dance club, the downloading criteria may be configured to have the ATM periodically download the sound files that correspond to the top 100 most popular dance songs for the month. If the ATM is located in a book store, the ATM may be configured to periodically download sound files representative of the best-selling fiction and nonfiction books for the month.

In the exemplary embodiment if the data store 13 does not have already stored therein the sound file that a user desires, the exemplary ATM is further operative to have the user enter a selection input corresponding to the desired sound file such as a title or the name of an artist or group. The ATM is then operative to query one or more remote content data stores for the requested sound file(s). A message is returned to the ATM which is operative to cause the processor to generate a listing of matching sound files which is displayed on the display device 14 of the ATM 10. In a response to one or more dispense inputs from the customer, and for a fee, the ATM 10 is then operative to download and dispense one or more of the matching sound files from an output device.

In some embodiments in which a network connection such as an Internet connection is not available or is not always used, the ATM may be operative to acquire sound files from portable storage mediums such as CDs. Such sound files may then be copied or ripped from the CD and saved locally to the data store 13 in the machine.

The exemplary ATM may be operative to dispense digital information in a plurality of different ways depending on the type of digital information. For example the ATM described in connection with FIG. 2 further includes an output device 18 that includes a sound system 60. The sound system 60 includes a sound signal amplifier 40 with a plurality of speakers 42. The ATM 10 is operative to output though the sound system 60, analog or digital signals that correspond to selected digital sound recording files. The signal amplifier 40 is operative to output sound through the speakers 42 that corresponds to the sound file signals. Such an ATM may then function as a fee-based digital music player or jukebox. For restaurants, bars, and other facilities that offer music, the exemplary embodiment offers the ability to generate user fees for both the dispensing of cash and the dispensing of audible music.

For other forms of digital information that is visual, such as text, documents, images or video for example, the ATM may be operative to output such digital content either through the display device 14 of the ATM 10 or through an output device 18 that includes a video system 62 or a printing system 64. A video system may include one or more monitors, TVs, speakers, LCD displays, or projection TV. Embodiments may include multiple output devices for outputting multiple forms of digital information concurrently. A printing system 64 may include a monochrome or color printer capable of outputting documents and/or photo quality prints of images or other graphics.

If multiple sound files or other forms of digital information have been selected for output through the output device, the exemplary embodiment may be operative to sequentially output each song either in the order the digital information was selected, or in other orders, including alphabetical by title of song, artist, album, style, or in a random order.

Alternative embodiments may also dispense digital information such as sound files, to other storage mediums. For example the ATM 10 may include a storage device drive 26 such as a CD-R or CD-RW drive which is operative to accept a portable storage medium 36 such as a write-once or rewriteable CD. For a fee the ATM may be programmed to dispense the sound file by writing a copy of the sound file on a user supplied CD. Alternatively, the ATM may include a supply of blank CDs or other media, and may copy the file onto the media and deliver it to the user. Examples of other types of storage device drives that are operative for use with embodiments may include portable hard drive readers such as an Iomega Jaz® drive; magneto optical drives such as an Iomega Zip® drive; flash memory drives for writing to flash memory devices such as CompactFlash and Sony Memory Stick®; DVD-R, DVD-RW, and DVD-RAM drives, Mini-CD drives, and digital tape drives.

Alternative embodiments may dispense digital information such as sound files, through an output device which includes a communication port 18 directly to a portable computing device. Examples of suitable communication ports 18 include a Universal Serial Bus (USB) port, a serial RS-232 port, parallel port, an infrared (IR) port, a radio frequency (RF) port such as Bluetooth, an IEEE-1394 port, or a network port such as a wired or wireless Ethernet connection. When a portable computing device such as an iPod or a Diamond Rio is connected to the port 18, the ATM may be operative for a fee to download MP3 sound files to the MP3 player. Examples of other types of portable computing devices that may receive dispensed digital information such as sound files include a portable computer such as a notebook computer, a personal digital assistant (PDA) and a mobile phone.

Alternative embodiments may be operative to dispense digital information to a user through the Internet by e-mail or FTP for example. In such embodiments the user may select the information through inputs to the ATM 10. The ATM would prompt the user to input through at least one input device an e-mail, FTP or other network delivery address. The ATM would then be operative through an output device such as a suitable network interface, to e-mail or FTP the selected digital information to the user, rather than dispensing the digital information through output devices, to a portable storage medium or to a computing device adjacent the ATM. Alternatively the ATM may send one or more messages through one or more networks to a remote computer, which messages cause the remote computer to send the selected digital content to the network address. Such a system may be useful for purposes of enabling a user to order as yet unavailable content, such as a new collection of songs by an artist, a movie, software, video games, a book, a television program, financial reports or other data that is not yet available. Exemplary embodiments may enable an ATM user to request such content prior to availability, and then receive it electronically as soon as it is released. Such approaches may enable the content owner to be assured payment by receiving payment in advance through operation of the ATM, or by being assured of payment at the time of delivery. Of course these approaches are exemplary.

Alternatively or in addition, an ATM user may in some embodiments operate the ATM to subscribe to other content that may be available for free. This may include for example content that is provided to entice a user to purchase another item for a fee. Alternatively such content may include information about investments, loans or banking products offered by a financial institution operating the ATM. Of course these approaches are exemplary.

Figure 3:
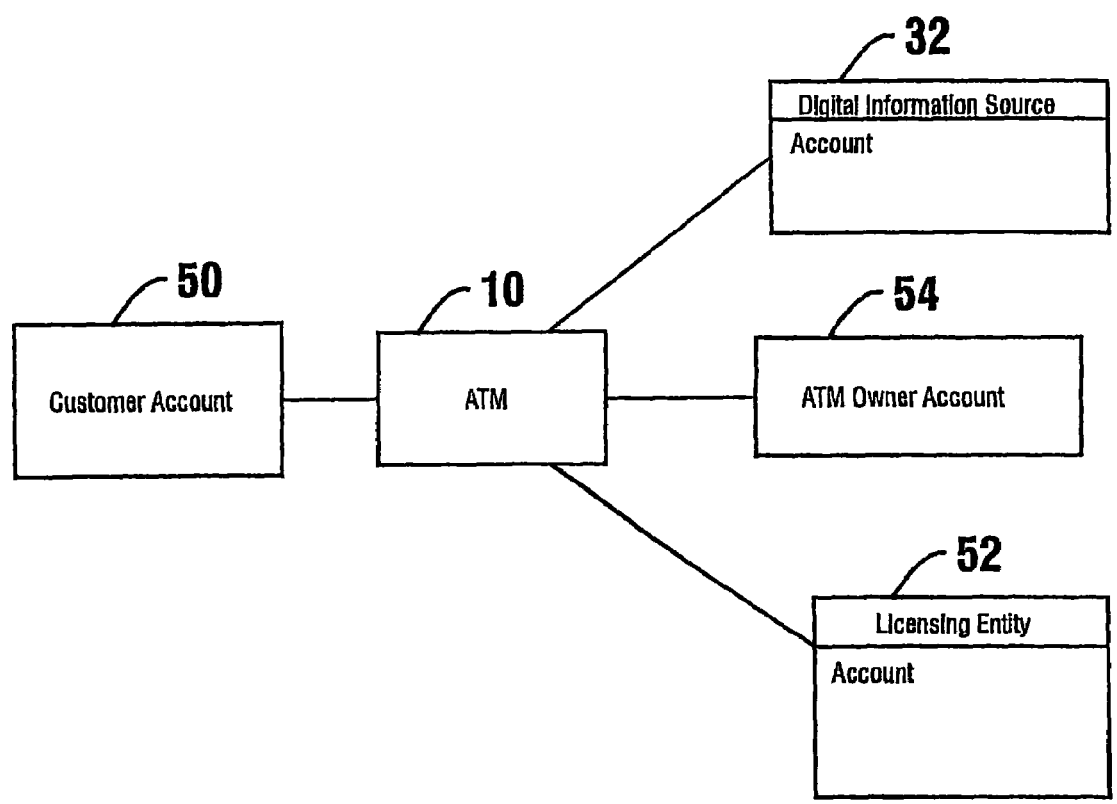
FIG. 3 is a schematic view representative of the distribution of transaction fees from digital information dispensed by an automated banking machine.

FIG. 3 shows a schematic view representative of accounts that are accessed by the exemplary ATM 10 for distributing user fees. Because the ATM 10 is in operative connection with a host banking system or other system for settling accounts, ATM 10 is enabled to deduct a user fee from an account of the user in exchange for the dispense of digital information. The exemplary embodiment of the ATM 10 operates by reading an account number from a card inserted by a user into the card reader 20. The account number includes data representative of one or more financial accounts associated with the user. The information on the card will include data corresponding to an institution where the user's account is held. Examples of cards that are operative for use with some embodiments include credit cards, bank cards, debit cards, merchant cards, smart cards, or any other portable medium that can store account or user information and/or data representative of stored value. The exemplary ATM 10 is operative to communicate with a financial transaction computer which includes or which can communicate with, a host banking system which can validate a user inputted PIN and authorize a transaction requested by the user at the ATM. If the PIN is valid and the transaction authorized, the message(s) sent by ATM 10 is further operative to cause the host banking system to debit user fees from the user's account corresponding to the requested dispense of cash and/or the requested dispense of digital information. Transaction fees or other charges for the convenience of using the machine may also be charged to the user's account. Alternatively as previously discussed, embodiments may identify users by biometric information. The biometric data from the user may then be used by a local or remote computer to identify the user and/or their associated account information.

The dispensing of most digital information is limited by the copyright owner. Typically the copyright owner requires a fee or royalty to copy, display, publicly perform or otherwise deliver the work. The amount of the fee may vary depending on how the work is authorized to be used. For example if the work is a sound recording, the fee to play the sound file one time in a restaurant may be much less than the fee to dispense the sound file to a portable storage medium which may be duplicated an unlimited number of times. Consequently, an exemplary embodiment is operative to track how digital information is dispensed and to transfer corresponding licensing fees to a licensing entity, a digital information source and/or other entities authorized to receive payment. Likewise stored information concerning the nature, location, size, contract status or other information concerning the establishment in which the particular ATM is located may be used to determine the fee. For example the fee to play a music file in a small restaurant may be less than in a large dance club. Similar principles may be applied to charging for other types of audio files, documents, images, videos, audiovisual files and pay-per-view type events.

The exemplary ATM 10 may be operative to debit a user fee from the user's account 50 for each dispense of digital information. The user fees may be transferred to a common banking account 54 of the operator of the ATM 10. Transfers of user fees may occur either immediately with each dispense and/or may occur periodically with the ATM 10 transferring data concerning multiple charges made to credit cards of various users to a financial transaction computer, such as a settlement host for example, which is operative to credit and debit accounts of the appropriate entities.

Licensing fees for downloading digital information from a digital information source may be transferred in a similar manner. The ATM 10 may generate messages or may include data in messages operative to cause a financial transaction computer to transfer a licensing fee from the account 54 that corresponds to the operator of the ATM 10, to an account of the digital information source 32. Such a transfer may be performed through the host banking system or through another transaction switch or through interaction of one or more financial transaction computers. Such transfers may occur with each download or may occur periodically for a batch of downloads which have occurred during a prior time period.

In an alternative embodiment, the ATM 10 is configured with inputs which include a terminal identifying UserID and a password for use when connecting through one or more networks to the digital information source 32. The UserID and password enable the ATM 10 to access the digital information source 32 and to download digital information. The digital information source 32 monitors all downloads that correspond to the UserID and periodically charges the account 54 that corresponds to the operator of the ATM. Alternatively for some types of digital information, the charge may be assessed against an account of the establishment where the ATM is located or an account of the operator of the establishment. This may be appropriate in cases where the use associated with the digital information, as indicated by the transaction messages received from the ATM and/or based on stored data, is a public display or performance of the work in the establishment. Of course other approaches may be used.

Once digital information has been downloaded to the data store 13 of the ATM 10, the copyright owner of the digital information may require that a licensing fee be paid with each dispense of the digital information to a user or upon each public display or performance. The ATM 10 or other connected computer is operative to keep records of each dispense of digital content and the character of dispense that is made. The exemplary ATM is further operative to transfer licensing fees associated with each dispense to an account of the digital information source 32 or another licensing entity 52 through the financial transaction computer. This transfer may be done with each dispense or periodically for a batch of dispenses.

In an alternative embodiment, the ATM 10 may be operative to transfer dispense records to the digital information source or the licensing entity through the Internet or other network. The digital information source 32 or licensing entity 52 may then debit or charge the licensing fees from an account that corresponds to the user, the operator of the ATM, the operator of the establishment or other appropriate entity.

For digital information that includes copy protection features or other technological measure to limit reproduction, access or use of the copyrighted work, the ATM 10 may be further operative to configure or incorporate the protection features and charge a user fee that corresponds to the copy or other protection features which are included. For example ATM 10 may be enabled to have the user select licensing features of a song file such as unlimited or restricted duplication, expiration dates, or other features of the sound file that affect the reproduction or use of the sound file. For example, the protection features used in some embodiments may restrict reproduction of the digital content so that it may only be played in the portable computing device to which it is initially delivered. Other features may restrict reproduction by preventing the digital content from being transferred from or otherwise reproduced in digital form from the media or device on which it is initially delivered. Other features may restrict reproduction by limiting the use of the digital content to a particular time period or to a particular number of plays. Of course additional or alternative approaches may be used depending on the system and the digital content involved. The ATM 10 may be operative to charge the user a corresponding user fee based on the type of protection features selected. The ATM may also be operative to cause the corresponding licensing or other fee to be paid to the source of the digital information or a licensing entity.

Alternative embodiments may be used in connection with systems which include stored information concerning particular users. Such systems may be used to correlate the identity of the user with marketing or customer preference data. Such information may include particular categories of music, videos, books or other materials or products that can be provided and/or that are of interest to the particular user. The ATM may operate to automatically give the user options for selections tailored to their associated preference information. Alternatively such information may be used to automatically provide the user with digital files, visual or audio outputs or other outputs whenever the user operates an ATM connected to the system. For example when the ATM is operated as a jukebox, the ATM may operate to automatically display indicia corresponding to favorite artists or songs, or to output one or more of the user's favorite songs.

In certain embodiments it may not be desirable for a user to access their financial account each time a relatively small charge for digital information is assessed to the user. In such systems the system may be configured so that the user is required to make a "minimum purchase." This amount may be a charge reasonably sufficient to offset the costs of accessing the account, for example $10 or $20. This amount would then be credited to a content prepay account associated with the user. Such an account is alternatively referred to herein as an accrued value account. A prepay account record indicating a credit associated with the user or their account would then be stored in one or more data stores. This credit information may be stored locally on a smart card or other item, at the ATM or remotely in a computer such as a financial transaction computer which can be accessed from the ATM. For example in some embodiments the amount may be credited to a licensing or other organization. Alternatively, a financial transaction computer may debit the prepay account of the user as it is used and route payments to the appropriate entities. The amount of value associated with the prepay account may then be reduced each time the user receives a delivery of digital content until the account is exhausted. Such a system may be advantageously used where the fees involved in each digital file transaction are small, such as the cost or playing sound files. Such a system also provides the system operator, licensing entity, or other entity the benefit of the "float" which is the ability to generate revenue by earning interest or other forms of income on the allocated funds.

To discourage or limit the unauthorized reproduction of digital information that may be dispensed, exemplary embodiments may be operatively programmed to modify features of the digital information before it is delivered for reproduction on a portable medium and computing device. For example with digital sound files, the processor in the ATM comprises a reproduction device that may operate to embed a digital code or certificate in the sound file that is reproduced on the user's portable digital sound player or other personal computing device. Such a certificate may further include an encrypted digital signature that can be used to detect unauthorized alterations of the file.

The portable sound player would only be operative to play the sound file if the digital certificate corresponds to a unique code or certificate associated with the portable sound player. Also the portable sound player would only be operative to play the sound file if the digital signature indicates that the sound file is authentic. Such features would limit playback of the file to the user's personal sound player. The sound file would be inoperative on another personal sound playing device that is associated with a different certificate or code. Of course the same principles may be used with files that are downloaded to the ATM itself for storage in the local data store, when the files are intended only to be played through use of the ATM and not transferred to other devices.

In alternative embodiments the ATM may be operatively programmed to have the user register with a licensing entity for the digital content prior to dispensing digital content for the first time. During the registration process the user would be associated with a unique license code or other identifier that may also be used when purchasing digital content in the future. The ATM may then be operative to embed the license code in each file that is dispensed for the user. The next time the user wishes to purchase digital information, the ATM may then be operatively programmed to accept the input of the license code from the user.

For example the license code may be manually input with the input device 16, read from a card with the card reader device 24, downloaded from the user's portable computing device 38, retrieved from another source and/or correlated with other data concerning the user. The ATM would then be operative to validate the license code by communicating with the licensing entity. If the license code is valid and/or is in good standing, the ATM would be operative to dispense additional digital information with the embedded license code of the user. Such a unique license code may be generated by the licensing organization, or may correspond to the previously described digital code or certificate associated with the user's computing device.

These described methods of copy and/or use protection of the dispensed digital information may be further associated with a subscription service or club. For example during the previously described registration process the ATM may prompt the user to sign up for a digital information service that for a monthly fee enables the user to dispense a certain amount and/or type of digital information. For example the service may correspond to the dispensing of music files or digital book text files. Each month the user would be entitled to dispense a certain amount of these files from the ATM for a discount club rate fee or for no additional fee per dispense transaction.

When the user first signs up for the service, the ATM may be further operative to enable the user to associate payment of the service or club fees to an account of the user for automatic debit of the monthly club dues or dispense fees from the user's account. Such automatic payment information may be acquired by reading account information from a user's credit card or banking card with the card reader device 20 of the ATM.

In an alternative exemplary embodiment, the digital information previously associated with a user may be retrieved from a processor of the digital information. For example the exemplary ATM may be in operative connection with a photographic film processor. A consumer may for example input with an input device 16 of the ATM a processing identification number associated with photographic film being developed and digitally scanned by the film processor. The exemplary ATM is operative to download digital images of the consumer's developed film from the processor which corresponds to the inputted processing identification number. The ATM is further operative to display the images and enable the consumer to select one or more of the images for printing to the printing system 64. The ATM may further enable the user to dispense the images to a physical medium and/or portable computing device of the consumer as previously described.

Figure 4:
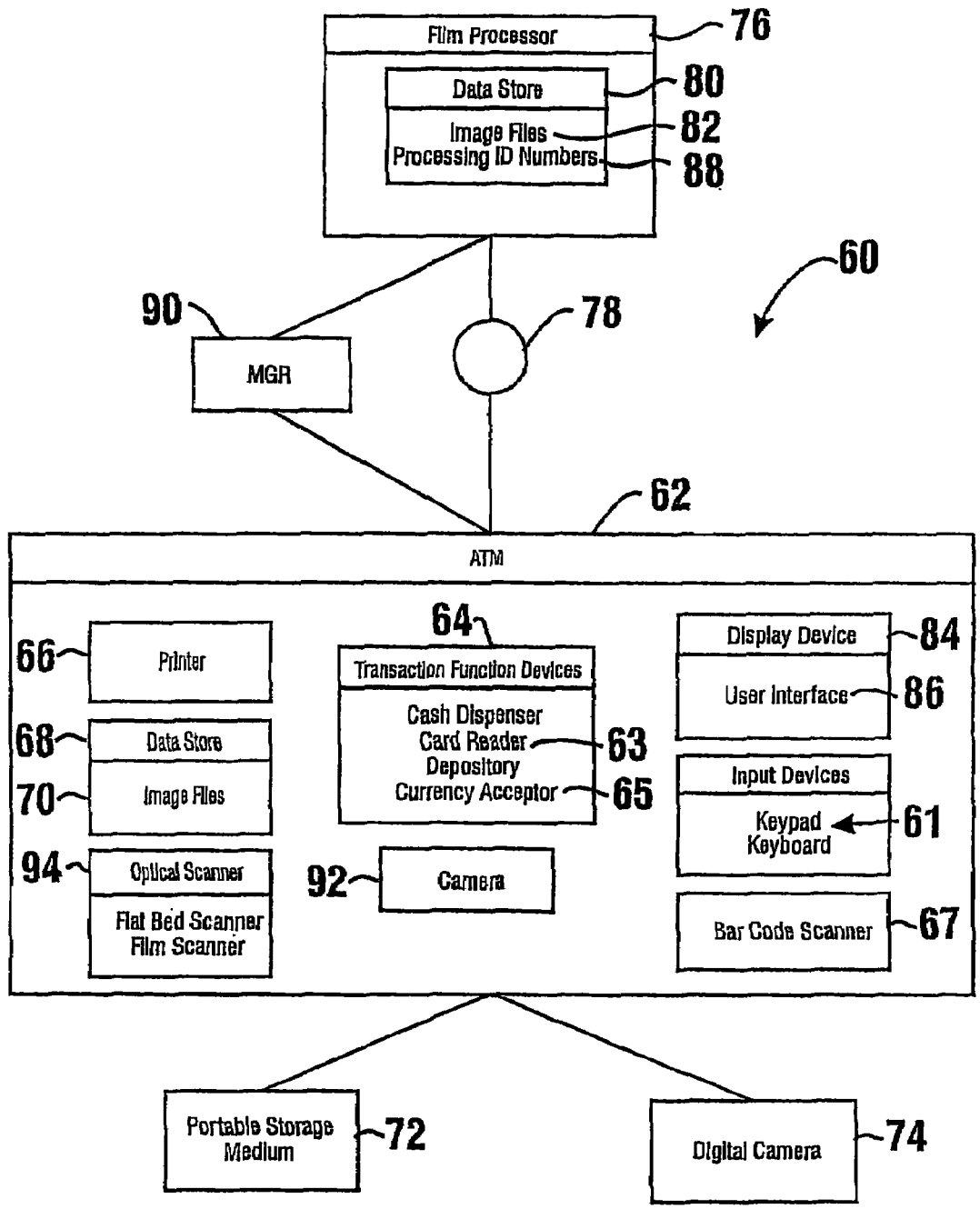
FIG. 4 is a schematic view representative of an exemplary automated banking machine and system that is operative to print files retrieved from either a portable medium of a consumer or a processor of digital information.

FIG. 4 shows a schematic view of this exemplary alternative system 60. Here the exemplary ATM 62 includes one or more transaction function devices 64 and a high resolution photo quality printer 66. The exemplary ATM 62 further includes a data store 68 that is operative to store a plurality of images files 70. The exemplary ATM 62 is operative to acquire image files 71 from a plurality of different external image file sources. The image file sources for example may include a portable storage medium 72 that is placed in operative connection with the ATM 62 by a consumer. The image file sources may further include a digital camera 74 that is placed in operative connection with the ATM 62. In addition the image file sources may include one or more film processors 76 in operative connection with the ATM 62 through a public or private network connection 78. In an exemplary embodiment the network connection may include the Internet.

To use the described exemplary ATM to print images originally captured on photographic film, the consumer first forwards the exposed film to a film processor 76. Exemplary film processors may for example receive film sent through the mail by the consumer and/or may receive film that has been dropped off at a film processing booth located at a store or other convenient facility. To facilitate tracking of the film, a processing identification number may be forwarded to the film processor with each individual roll of film. For example, each film being dropped off at a booth or being sent through the mail may be placed in a shipping envelope or other container supplied by the film processor. Each shipping envelope may include a unique processing identification number such as a film processing number preprinted on the shipping envelope. The shipping envelope may further include a tear off receipt that includes a matching film processing number. The film processing number on the receipt may then be inputted into an ATM to retrieve and print one or more of the images developed by the film processor.

In alternative exemplary embodiments, the processing identification number may correspond to a processing account number for a film processing account previously established by the consumer with the film processor. When sending in film to be developed, consumers may record their processing account numbers on a shipping container for a roll of film. If a consumer has multiple rolls of film, each may be associated with the consumer's processing account number prior to sending to the film processor. The processing account number may then be inputted into an ATM to retrieve and print one or more of the images developed by the film processor.

When film is received by the film processor 76, the film is developed and digitally scanned or otherwise processed to produce image files 82 representative of the images exposed on the film. The film processor 76 is further operative to store the image files 82 in a data store 80 for later retrieval by one or more ATMs 62 of this described exemplary embodiment. In the exemplary embodiment, the image files 82 in the data store 80 are associated with the previously described processing identification numbers 88 such as a film processing number or a processing account number of the consumer.

The exemplary ATM 62 provides a user interface 86 through a display device 84 of the ATM which enables the consumer to retrieve image files generated by the film processor. To facilitate the retrieval of the image files from the film processor 76 which correspond to the consumer, the exemplary ATM 62 is operative to prompt the consumer to input one or more processing identification numbers 88 which are associated with the image files 82 stored in the data store 80 of the film processor 76. In one exemplary embodiment the processing identification numbers may be inputted though a keypad or keyboard 61 of the ATM 62.

In alternative embodiments, the exemplary ATM 62 may include a bar code scanner 67 or other code reading device that is operative to scan and input the processing identification numbers from a processing receipt, account processing card, label, or other medium in the possession of the consumer. In this described exemplary embodiment the processing receipts, or account processing cards may include a bar code or other machine readable indicia which enables the scanner 67 to quickly and accurately scan and input the processing identification numbers into the ATM. In a further alternative embodiment, the exemplary ATM 62 may include a card reader 63 that is operative to read processing identification numbers from a magnetic stripe card or a smart card previously issued to the consumer. The exemplary ATM 62 may further prompt the consumer to enter a password or personal identification number (PIN) that is associated with the processing identification number stored on the card.

The ATM 62 is operative to contact the film processor 76 and forward the inputted processing identification numbers and/or PINs to the processor 76. In response to receiving the inputted processing identification numbers and/or PINs, the film processor is operative to validate the inputted processing identification numbers and/or PINs. Validations may include for example whether an inputted processing identification number corresponds to received rolls of film and/or whether the inputted processing identification number matches the inputted PIN. If the inputted processing identification numbers are valid, the film processor is operative to forward one or more image files 82 to the ATM 62 which correspond to the inputted processing identification numbers. The image files 70 received by the ATM 62 are saved in the data store 68.

When the film processing number does not correspond to image files stored in the data store 80 of the film processor 76 or the inputted processing identification number does not match the inputted PIN, the at least one computer of the film processor is operative to send the ATM 62 a message indicative of the inputted processing identification number being invalid. The exemplary ATM 62 may then prompt the consumer to reenter the correct processing identification number and/or PIN.

Once the image files have been received or while the image files are being received, the exemplary ATM 62 is operative to display with the display device 84 a listing of the image files 70. In one exemplary embodiment, the listing may include small thumbnail views of the image files. The exemplary ATM enables the consumer to select one or more of the retrieved images for displaying in a larger size on the display screen 84. The exemplary ATM further enables the consumer to individually select one or more retrieved images for printing by the ATM with the high resolution photo quality printer 66. The exemplary ATM also enables the consumer to individually select one or more image files for saving by the ATM onto a portable storage medium 72.

In addition the exemplary ATM is operative to perform a plurality of image processing functions on image files selected by the consumer. Exemplary image processing functions performed by the ATM may include cropping, red-eye removal, contrast adjustment, sharpening filters, softening filters, color adjustment, or any other image manipulation function which is operative to alter the displayed and/or printed appearance of an image.

The exemplary ATM is further operative to provide the consumer with a plurality of sizing and portrait or landscape orientation options for printing one or more selected images. Sizing options for example may include printing a single 8×10 (inches) image on a single sheet of photo quality paper with the printer 66. Sizing options may further include printing four 4×5 (inches) images on a single sheet of photo quality paper. The exemplary four 4×5 images may be of the same image file or may be selected from up to four different images files. Sizing options also may include printing a plurality of smaller wallet size images of a single or multiple image files. In addition the exemplary sizing options may include custom sizes inputted by the consumer.

The exemplary ATM 62 may be operative to retrieve image files from a plurality of different film processors. In one exemplary embodiment, the inputted processing identification numbers include an address portion that is representative of the communication address of the film processor. The exemplary ATM 62 is operative to contact the correct film processor through the network 78 responsive to the address portion.

In one exemplary embodiment, the ATM 62 includes data representative of the communication addresses which correspond to the address portions of the inputted processing identification numbers. Exemplary communication addresses may include a network address such as a TCP/IP address of a server of the film processor. The exemplary communication addresses may further include a phone number of a remote access server of the film processor.

In a further exemplary embodiment, rather than having the ATM 62 include data representative of the communication addresses of a film processor, the ATM may be in operative connection with a message gateway router (MGR) 90. The MGR 90 is operative to establish a communication link between a plurality of ATMs and a plurality of film processors responsive to the address portions of the inputted processing identification numbers. The exemplary MGR 90 is operative to forward inputted processing identification numbers and other messages from each ATM to the correct film processor and return corresponding image files and other processing messages to the correct ATM. An example of an MGR that may be used with the present exemplary embodiment is found in U.S. Pat. No. 6,039,245 of Mar. 21, 2000, which is incorporated herein by reference in its entirety. Exemplary embodiments may operate using the principles described in U.S. Pat. Nos. 7,080,036; 7,025,255; 7,162,449 and/or 7,080,036 the disclosures of which are incorporated herein by reference.

The exemplary ATM 62 may include alternative configurations based on the speed of the connection between the ATM 62 and the film processor 76. For example large high resolution image files may take a considerable amount of time to download from the film processor to the ATM though a low speed dial up network connection. As a result, the exemplary embodiment may be operatively configured to initially download relatively low resolution and/or highly compressed "thumbnail" versions of the image files to the ATM 62. The ATM may then output the thumbnails on the display 84 of the ATM 62. Only after a consumer selects a thumbnail for viewing in a larger format, for printing, or for exporting to a portable storage medium, will the ATM 62 send a request to the film processor to download a corresponding high resolution version of the image file to the ATM 62

The exemplary ATM 62 is operative to charge fees to an account of a user or accept cash from the user for the services of printing and/or dispensing the images files. Exemplary ATMs 62 may enable the consumer to pay for printing and/or dispensing image files with a credit/debit card though use of the card reader 63. Exemplary ATMs may further enable a consumer to pay for printing and/or dispensing image files from the ATM by inserting currency into a currency acceptor 65.

The exemplary ATM 62 is operative to allocate portions of the fees received from the consumer among the film processor, the servicer of the ATM, and/or the operating entity which provides space, electricity, and a network/phone connection for the ATM. In one exemplary embodiment the allocations of fees is performed by transferring portions of the fees to financial accounts associated with each one of the film processor, servicer, and operator of the ATM.

In one exemplary embodiment the ATM 62 is operative to charge the consumer for the number of images printed or dispensed to a portable medium. In an alternative exemplary embodiment the ATM is operative to charge fees based on the amount of paper required to print the images. For example a single 8×10 image on a single sheet of paper may cost the same as four 4×5 prints on a single sheet of paper. In a further exemplary embodiment, the ATM 62 is operative to charge a processing fee for the development and scanning of the film and individual printing fees based on the number of images printed or the amount of printer paper consumed. In further alternative embodiments other methods of deriving and allocating fees for the services of printing and dispensing image files from the ATM 62 may be used.

In an alternative exemplary embodiment, the exemplary ATM 62 may retrieve image files from a portable storage medium 72, digital camera 74, or other device of the consumer. The exemplary ATM may then enable the consumer to selectively print, for a fee, individual images with the printer 66 of the ATM 62. As discussed previously, the exemplary ATM 62 may enable the consumer to perform imaging processing function on the images, and may enable the consumer to select the desired size and orientation of the images to be printed.

In addition to printing image files, the exemplary ATM 62 may further enable the consumer to retrieve other printable documents from a portable storage medium 72 or other device of the consumer. Examples of other printable documents, include word processing documents, Acrobat PDF documents, web pages, CAD files, Post Script documents, or any other type of digital content that is capable of being printed to a printer 66 of the ATM 62.

In a further alternative embodiment, the ATM 62 may include a camera 92 securely affixed to the ATM. In this described exemplary embodiment the ATM 62 is operative to enable a consumer for a fee to take digital photographs with the attached camera 92. The digital photos may then be dispensed to a portable medium 72 or printed out with the printer 66 as previously described. In one exemplary embodiment the camera 92 may be integrated into the fascia of the ATM with the lens positioned to photograph individuals or other objects standing in front of the ATM 62. In addition, the ATM 62 may be operative to display a live image of the field of view of the camera 92 on the display 84 of the ATM 62. Also the ATM 62 may display selectable functions with the user interface 86 for optically and/or digitally zooming between wide angle and telephoto views. The ATM 62 may further include selectable functions with the user interface 86 for adjusting the focus, contract, shutter speed, aperture, or any properties of the camera 92 that effect the captured image.

In a further alternative exemplary embodiment, the described ATM 62 may include an optical scanner 94 such as a flat bed scanner or a film scanner, which is operative to generate image files from photographs, slides, and/or negatives. Consumers may use the exemplary ATM 62 to generate image files by scanning pre-existing photographs and/or film with the optical scanner 94 of the ATM. For a fee these scanned-in image files may be printed out with the printer 66 or dispensed to a portable medium 72 as previously described.

The computer processors in the exemplary ATMs 10 and 62 operate to perform processes described herein responsive to software stored in one or more data stores, such as data store 13, 68. The software stored in data store 13 is loaded or stored therein from one or more forms of programming media. Such programming media may include any media or article from which computer executable instructions can be copied or read by a computer such as one or more CDs, diskettes, hard drives, tapes, flash memory or other items.

In an alternative exemplary embodiment, an ATM may assist a user in ordering goods. For example, the automated transaction machine can have user friendly operating instructions for making purchases. The machine may also provide a variety of payment options.

Some persons may be without bank cards, credit cards, or debit cards. These persons may be without credit or are uncomfortable with the technology involved therewith. Still other persons may prefer to carry out their transactions with cash (i.e., bills or coins).

An exemplary embodiment enables a user to use cash as payment for their goods order. The automated banking machine, such as ATM, may have a cash accepting device. That is, the machine is capable of permitting cash based network (e.g., Internet) purchases. Thus, the exemplary embodiment provides for a user to shop online, yet pay with cash. Furthermore, the user is not required to own a network accessible computer to carry out the shopping. Additionally, the system may be arranged so that a user may or may not have a preexisting account associated with the particular machine. Thus, an exemplary system may permit walk-up online shopping to any user capable of paying cash for their purchase.

An ATM may permit a user to browse a web site, select one or more items, and proceed to checkout. At this point the user may insert a cash amount, corresponding to the purchase price of the item(s) and any additional user fee, into the ATM. The ATM may operate to verify the cash amount and then forward information to the web site to complete the purchase.

The ATM may be arranged to require the user to input cash either prior to permitting a user network access or after network access, or after receipt by the machine of a particular message such as after payment is requested from the web site. The ATM may provide billing information to the web site prior to or after checkout. The ATM may be programmed so that an account of an entity who is not the consumer, such as an administrator (e.g., owner, leaser, renter, or operator) of the ATM could be charged or debited the amount of the goods ordered. Although the administrator could use the machine, the administrator would generally not be the user who provides the value to the ATM to pay the price or amount for the associated goods or services.

The ordered product could be delivered to an address (e.g., physical or digital) provided by either the user or the administrator. Of course in some embodiments the merchant may also dictate where and when the product may be received. For example, the machine may be located in a warehouse facility and the product is delivered to the facility for pickup.

The machine may include a printer and the user may be presented a receipt for amounts input and/or the product purchase. The receipt may be used to pick up the product after its delivery to a location other than the user's address. For example, a product ordered from a Target® store may be available for pick up at a selected Target® store. Alternatively, the system may be such that the user may pick up the goods at any Target® store.

It should be understood that the term online in this disclosure relates to any network or combination of networks that the machine may access (directly or indirectly) to enable a user to remotely purchase goods. For example, a private network, public network (such as the Internet), virtual private network, intranet, or a local network may be considered online. The products and services available for purchase may be dictated by the products and services available online. As previously discussed, the products may be in physical or digital form. The services may be intangible, such as game playing. Additionally, the services may include for example, Internet gambling, fee based adult content sites, off-track betting on sports, horses, dogs, etc., lottery games, fortune telling, fee based web sites, utility payments and charitable donations.

In some embodiments the user may need to initially register with the system. The ATM may present a series of queries to obtain one or more identifying inputs from the user so that the ATM may operate in conjunction with the host to set up an account for the user to facilitate future use of the ATM. The account may be associated with user information, such as address or delivery information. Other information associated with the account may include demographic information. The account may be correlated through operation of one or more computers with another account of the consumer such as a bank account, credit card account or line of credit. The information may be used by the administrator of the ATM to provide more ready use and quicker online set up of the machine for that particular user during a subsequent use. For example in some embodiments a user may operate the machine to pay amounts for goods or services in a plurality of separate sessions, between which there are time periods in which other users conduct transactions at the machine. Other uses of the information may include the presentation of specific advertising targeted to that particular user. For example, the advertisements may be provided on a display screen during waiting periods.

In some embodiments an automated transaction machine may be affiliated with one or more online retailers. These retailers may include in their web interface an additional payment option at checkout. For example, the payment option may be "ATM". This option may be in addition to credit card, debit card or other options that may be used to make payment from a PC. Upon selecting the "ATM" payment option the user would next be required to feed the needed amount of cash into a cash or currency accepting device of the machine. An exemplary cash accepting device is shown in U.S. Pat. No. 6,520,408, the disclosure of which is incorporated herein by reference. The machine may include a valuation device in operative connection with the cash accepting device that operates in conjunction with the computer to check the amount provided to the machine against the needed amount. The validation device may be of the type shown in U.S. Pat. No. 5,923,413, the disclosure of which is incorporated herein by reference. After making a comparison of the amount fed into the machine is at least as great as the associated price, the machine could notify the merchant that the purchase should proceed. This may be done for example by sending one or more messages, such as a confirmation message to the merchant through a network. Of course, at other stages of the purchasing process, the machine itself could present the user additional choices of payment. For example, at the stage of checkout the machine may offer the user a lower purchasing price if the user elects to pay by credit card or debit card instead of cash, or vice versa.

Additionally, a customer using a computer not associated with an automated transaction machine may be able to reach the checkout payment options at a retailers web site. The programming associated with the server operating the merchant site may be such that the "ATM" payment option (or another distinct option) may be layered to permit the customer to save the order information to enable later payment at an automated transaction machine. For example the customer may be given a code or password that is associated with and which enables the ATM to operate to retrieve the previous order information. A user of the ATM may then quickly contact the web site, insert the necessary code, and complete the payment. The machine operates to cause the amount paid by the user to be allocated towards payment for the ordered goods. This may include in some embodiments, the merchant receiving payment through the machine operating to cause the merchant to be provided with an account of the administrator, the administrator being charged for the order, and the administrator retaining the cash deposited in the machine. Alternatively or in addition such allocation may include the machine causing an electronic transfer of funds from the administrator to the merchant to pay for the order. Of course various approaches may be used to allocate the cash the user provides to the machine to the payment required to be made corresponding to the order. The described exemplary arrangement may reduce the time necessary to make a purchase because the customers would already have a general or exact idea of how much their purchase will cost. Thus, the user could hold a sufficient amount of cash before using the machine. The arrangement also permits a customer to place a preliminary order and save the order information when a cash accepting ATM is not immediately available to the consumer. Alternatively the ATM may also be programmed to receive a customer's code or other identifying data, contact the vendor (either online or offline), and (after receiving the user's cash) complete or consummate the order without the user having to again navigate through the retailer's entire web site or other order interface.

In exemplary embodiments an administrator of the ATM may be required to oversee payment to the merchant (or web site) for the cost of the ordered goods. The administrator may have an account billed for later payment. For example, the administrator may receive an itemized periodic bill from a particular merchant relating to online purchases paid for via the ATM. Other payment options may include the immediate transfer of funds from an account of the administrator or a third party on behalf of the administrator, to an account of the merchant. Alternatively the administrator may have an open running account with an affiliated merchant. In other embodiments third parties may serve as a clearing house between merchants, ATM operators or other entities who receive cash or other value allocated to orders.

In some embodiments an administrator may receive revenue from fees charged to the online retailer (which may be similar to credit card fees), from advertising, and/or from user fees. The administrator may also receive a certain percentage of the purchase price of the goods from the retailer for enabling the user to purchase from that retailer. Furthermore, the retailer may pay access fees (e.g., IP, DSL) to the administrator for the network access time. Of course other revenue may be generated based on other arrangements with retailer or web sites, such as providing links to related web sites which may be of interest to particular users.

Other revenue generating arrangements may also be implemented in some embodiments. For example, the user may be required to pay a cash user fee for an initial time period during which services are provided. The time period, which may be extendable by additional payment, could permit the user to browse the Internet or a selected online collection of web sites or in an online catalog as desired while compensating the administrator for the network access. The user fee may also be of such an amount that it would enable the administrator to recoup costs associated with permitting the user to use the machine without making a purchase. The user fee could be refunded (or credited) toward the cost of purchased goods or services if the user actually makes an online purchase.

In some embodiments the ATM may be operatively programmed to calculate a price associated with an order. This may include for example the computer being operative to cause the calculation either at the ATM and/or at a host, of a price which is a function of an amount required to be paid to the merchant plus added fees. These fees may include for example, service charges, access charges, taxes or other amounts that the consumer is required to pay related to the purchase. The computer may then operate to cause the order to be entered or confirmed by sending one or more messages through the appropriate network.

In some embodiments the ATM may be operated to accept multiple payments from a user during separate transaction sessions. For example, the machine may be programmed to accept multiple payments from a user toward a particular order. This may include the user making weekly payments for example toward an order. This may include for example, advance payment for utility services, payment of rental charges or other fees, or the user paying so much periodically toward particular goods or services. In some embodiments the orders may be associated with a standing arrangement between a user and a provider of goods or services and an order placed through the ATM may identify that arrangement rather than initiate it. In some embodiments the user may have a preestablished account which may be associated with the user or their transactions and which may be used in operation of the machine and system to allocate the user's payments to the particular order. The account may be associated with a card, a code or biometric feature for example. In some embodiments the machine may be operative to open an account for the user by the user providing one or more identifying inputs through one or more input devices of the machine. The machine may operate to cause the value of cash or other items input by the user to the machine to be credited to the account. The machine may operate to cause appropriate electronic records to be produced and/or to provide the user with appropriate statements such as by printing receipts indicating full or partial payments made, or other status information. In some embodiments an account may be debited through the system either for the full amount or for partial amounts responsive to deliveries of goods, services or use. In some embodiments the machine may be further operative to cause the user account to be closed after the order has been transmitted and the amount therein debited. Of course various approaches may be used based on the nature of the transaction, goods or services ordered.

In some embodiments a delivery address for the items associated with the order may be input by the user at the ATM or in advance by the PC. Alternatively the machine may be programmed to provide the address specified by the administrator. This may be for example a location where the consumer may take delivery of items ordered.

In some embodiments cash equivalent payments may be accepted by the ATM. For example, the ATM may include a money order or check verification system. Thus, the machine could accept a check or money order in lieu of cash. The machine could then credit the user an amount equivalent to a cash payment. Further the ATM may be operative to dispense to the user any change representing the excess of value input above the price for a given order. For example the ATM may include features described in allowed U.S. Pat. No. 6,573,983, the disclosure of which is incorporated herein by reference.

Furthermore, in some embodiments the machine may be arranged to accept combinations of different types of payment. The machine could accept a partial credit card payment and a partial cash payment for the same purchase. For example, a user may desire to purchase goods with a credit card that is near its credit limit. The user could select to the pay a specific amount with the credit card and the remainder with cash. Thus, another payment option would be related to a "combination payment". This may be desirable for example when the user desires to charge part of the items purchased to a card used for business and wishes to pay cash for personal items.

As discussed herein, the apparatus and method of an exemplary embodiment permits use of a cash accepting automated banking machine to make an Internet or other online purchase. The user of the machine pays the machine cash for the goods purchased. The machine's administrator is responsible for the payment to the merchant. Thus, the machine may act as an intermediary in allowing a consumer to purchase online goods from a seller. It should be understood that a user with a bank or credit card account may also have access to all of the previously discussed features associated with the ATM such as paying for orders via credit or debit card account. In some embodiments the ATM may be operative to carry out cash dispensing transactions in which the value of cash dispensed is assessed to the user's account. Furthermore, the ATM may be a cash recycling ATM such as described in incorporated U.S. Pat. No. 6,520,408. This enables the ATM to dispense cash previously received as payment for online purchases to users of the ATM making cash withdrawals. It should also be understood that the term "goods" may be applied in the singular or plural. For example, a "goods" may constitute only a single item or a plurality of items.

Figure 5:
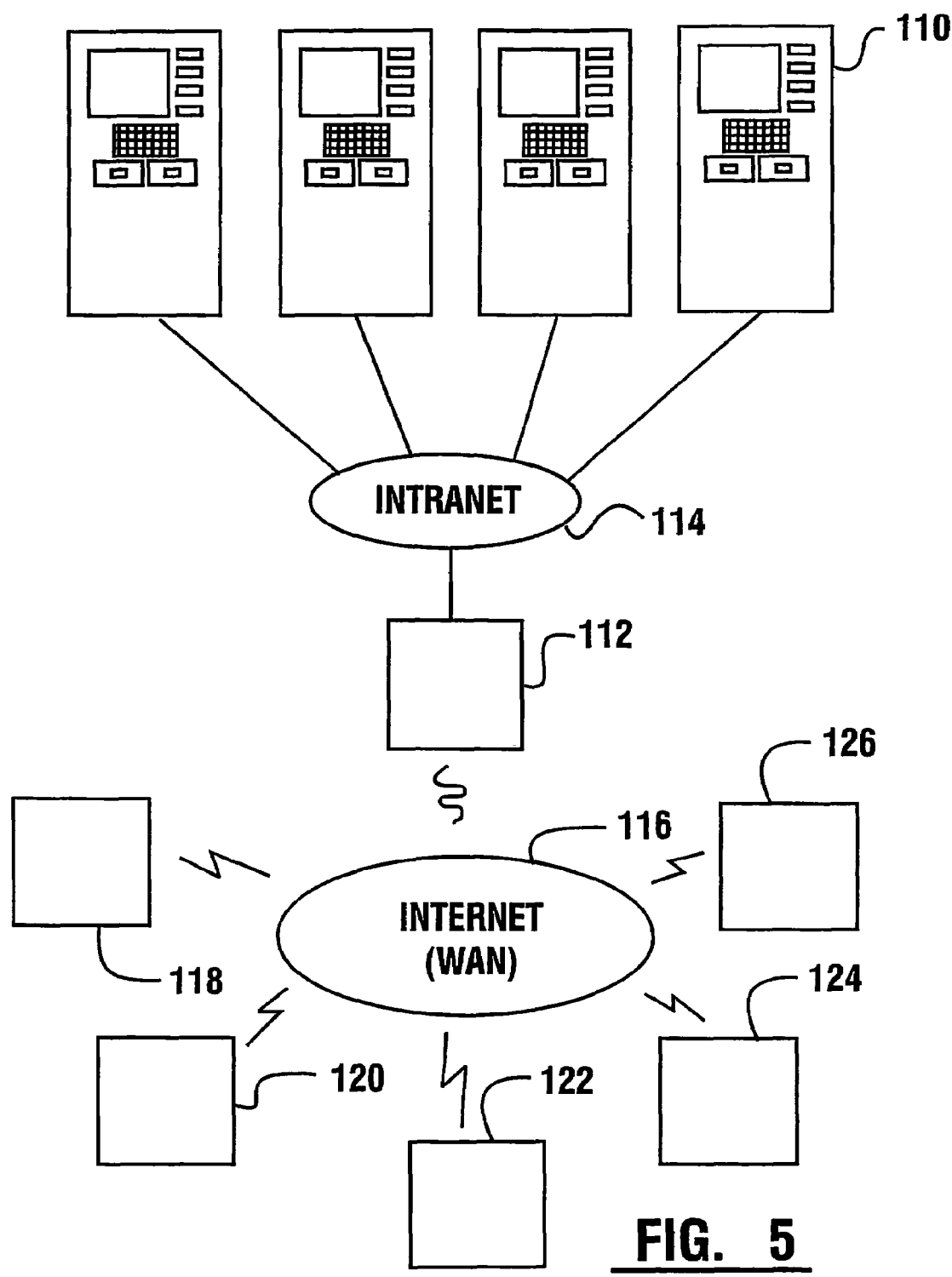
FIG. 5 is a view representative of an arrangement that is operative to permit cash payment for goods ordered through a network.

FIG. 5 shows a view of an exemplary system arrangement permitting cash payment for goods or services purchased online. A plurality of automated banking machines 110, such as ATMs, are shown connected to a computer system 112 of a home host, such as a home bank or merchant. Home host computer system 112 is operated by the bank or other entity which has primary responsibility for the ATMs 110. An ATM 110 may include a cash acceptor device and other components and features as previously discussed. Certain exemplary ATM transaction function devices and the operation thereof is disclosed in U.S. Pat. No. 6,273,413, the disclosure of which is incorporated herein by reference.

ATM host computer system 112 is shown connected to the ATMs 110 through a network 114. The network 114 may be a local or proprietary network that may provide communication between the computer system 112 and the machines 110 using messages in the transmission control protocol/internet protocol ("TCP/IP") format. The messages that are communicated through the network 114 may include TCP/IP messages and hypertext mark up language ("HTML") or other mark up language documents.

Home computer system 112 is also connectable as shown to a wide area network 116. In some embodiments the wide area network 116 may include the Internet. In other embodiments, other wide area networks may be used. The wide area network preferably communicates messages in TCP/IP between numerous computer systems connected to the wide area network. Thus, a particular ATM may be operable to access a plurality of web sites 118, 120, 122, 124, and 126 associated with the network.

Figure 6:
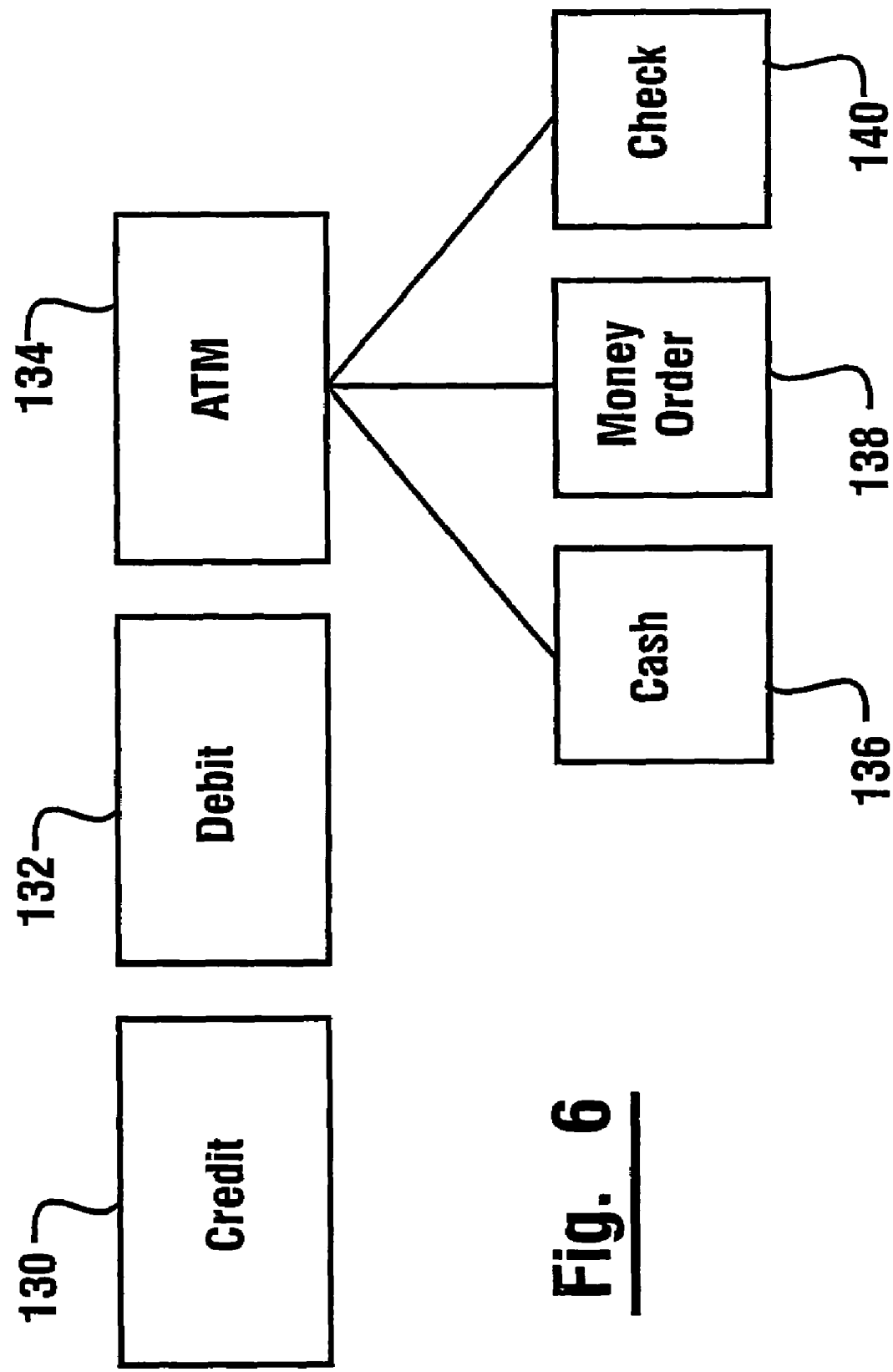
FIG. 6 is a view representative of user payment options.
Figure 7A:
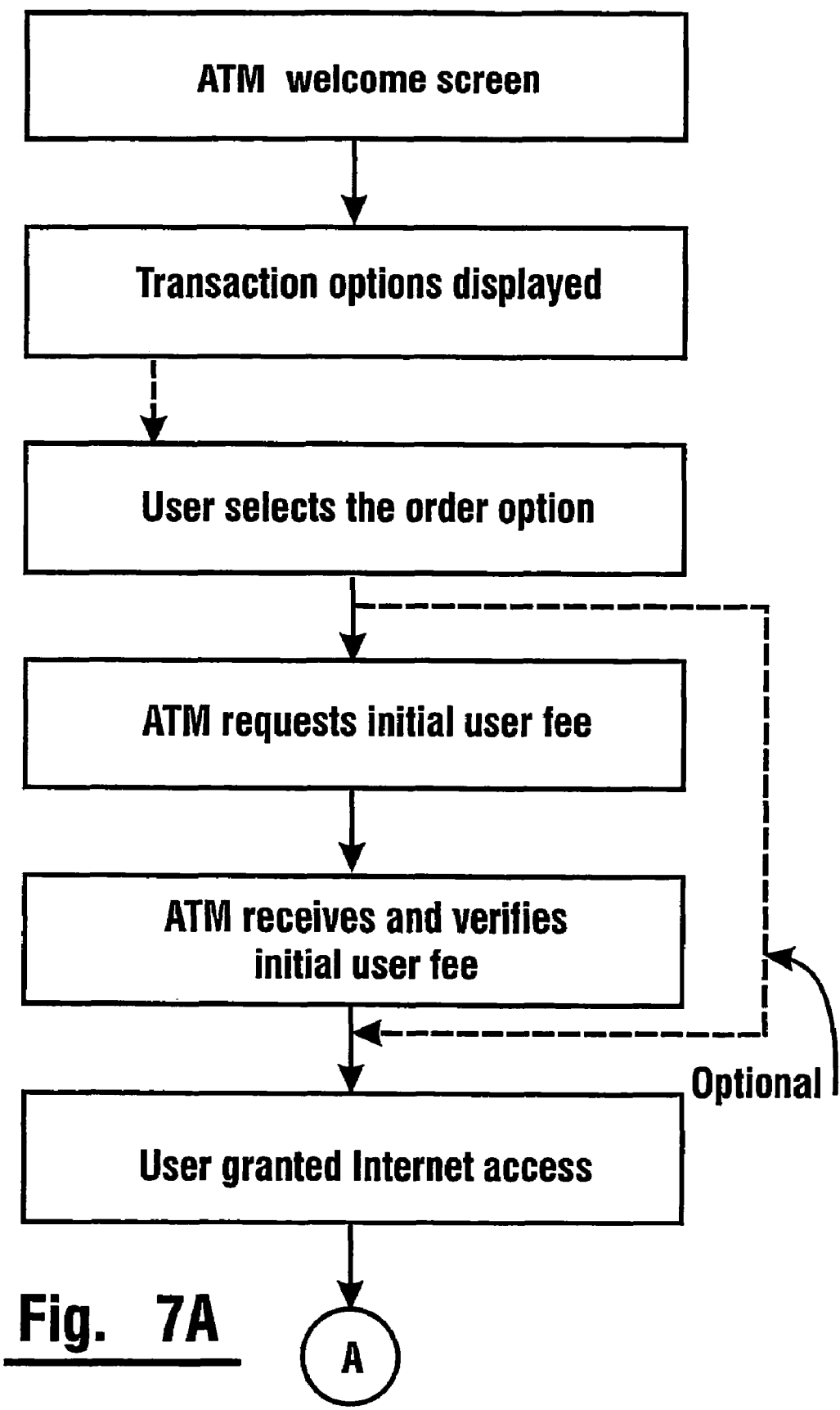
FIGS. 7A through 7E are representative of exemplary steps relating to purchasing of goods.
Figure 7B:
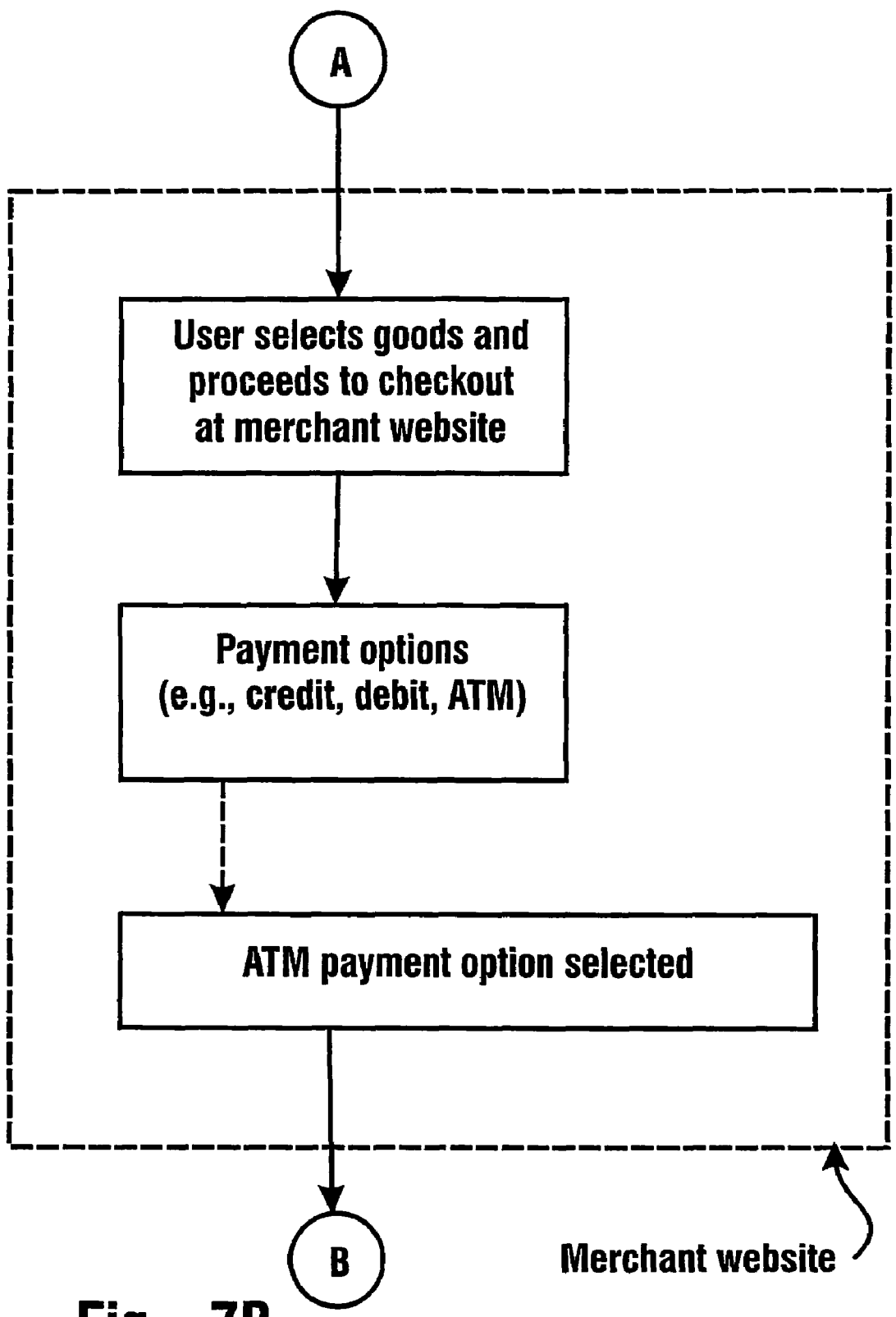
Figure 7C:
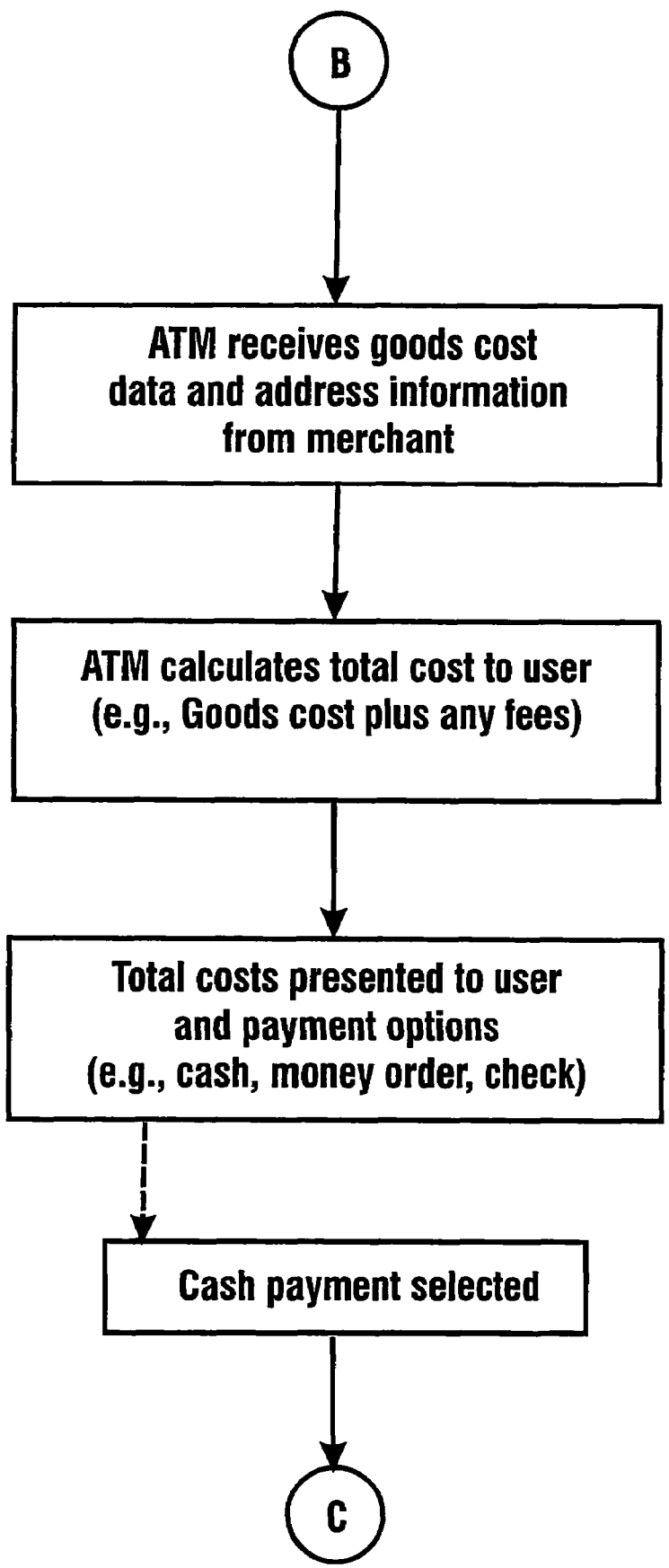
Figure 7D:
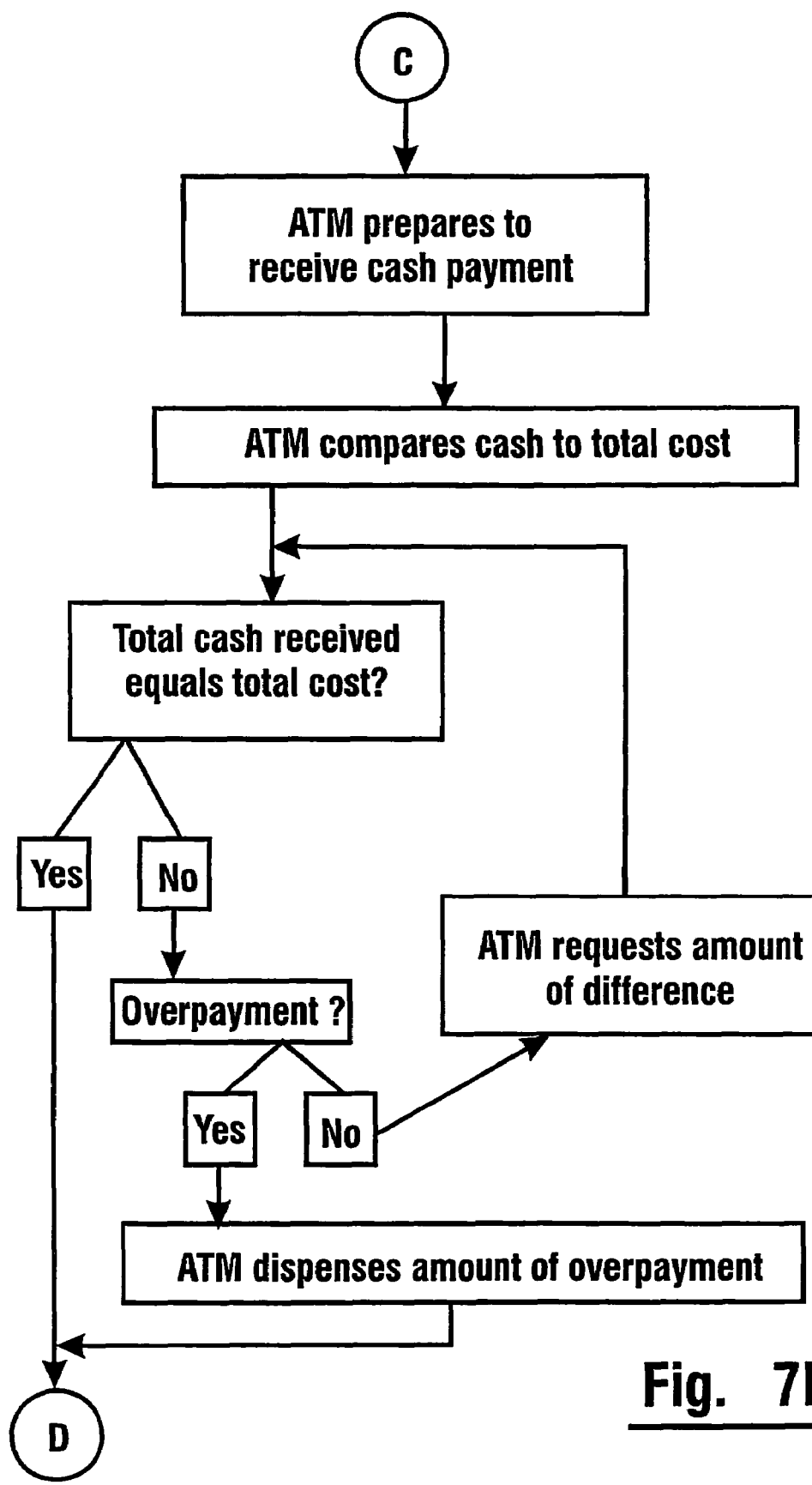
Figure 7E:
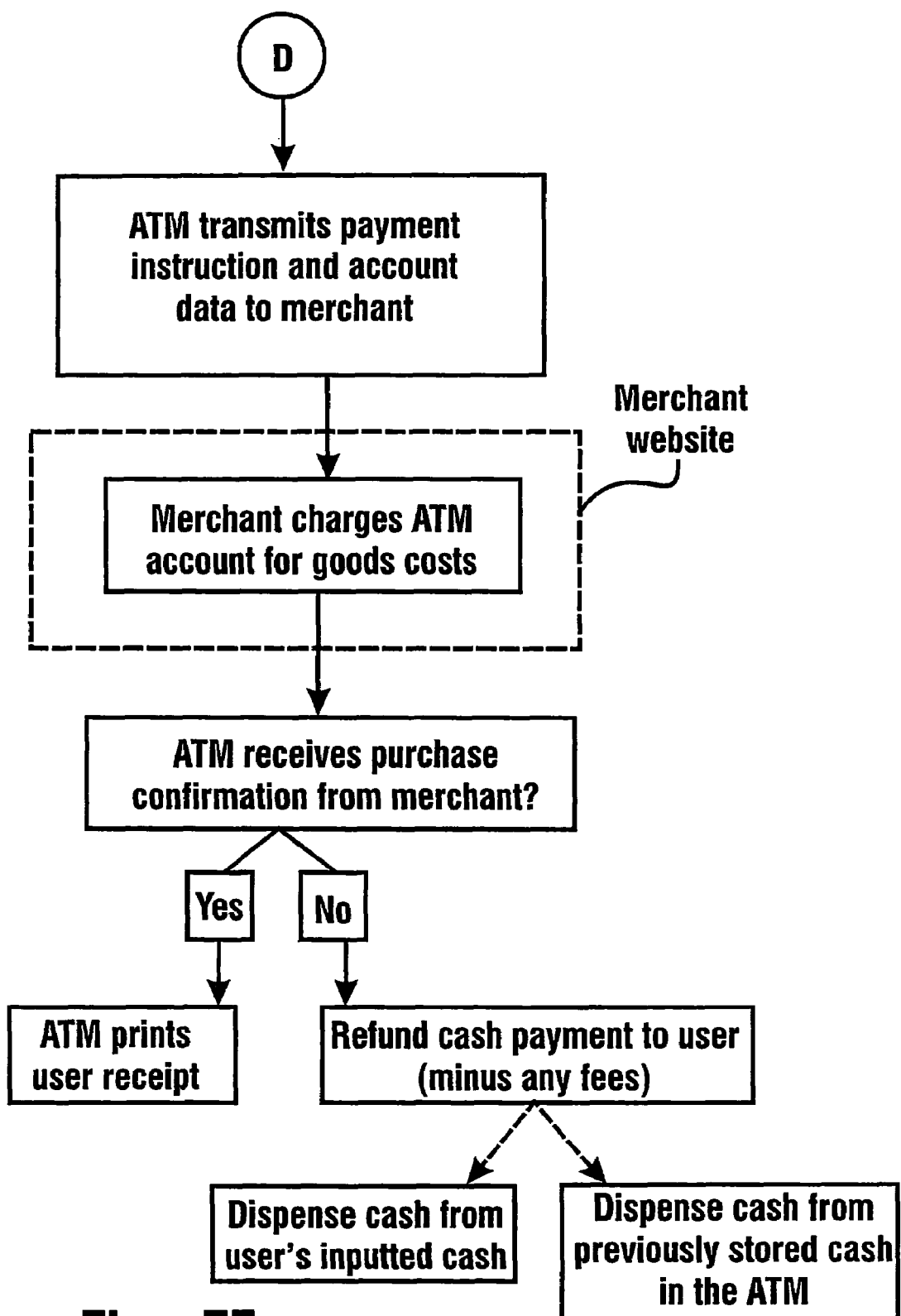

FIG. 6 shows a schematic view of an exemplary display of payment options presented to a user by a web site offering online purchases that can be paid for with cash that is received by an ATM. The payment options may correspond to, be represented by or be associated with buttons or icons on the machine's display screen. The payment buttons may for example correspond to credit card (130), debit card (132), and ATM (134). The machine may include a touch screen device to permit user payment selection by touching one of the payment buttons or icons. A user selecting the ATM payment button (134) may additionally be asked (responsive either the merchant web site or responsive to programming of the machine), such as through the display, whether the ATM payment is by cash (136), credit card (130), debit card (132), money order (138), or check (140). Responsive to the payment selected, the ATM would operate the pertinent devices to cause the machine to receive the indicated payment in the selected manner. For example, responsive to a check payment option being indicated, the machine would prepare to receive the check and operate to make a determination if the check is to be accepted. If a cash payment option is selected then the machine would prepare the cash acceptor device to receive the currency.

FIGS. 7 A-E show schematically an exemplary sequence outline of steps that may occur during the process of purchasing goods from a merchant at a web site with use of an ATM.

It should be understood that in some embodiments an automated transaction machine may be a stand alone machine directly connected to a network such as the Internet without using an intranet. Various forms of communications devices and network connections may be used, including those involving wireless or satellite usage. Additionally, a machine may be configured for ease of modification to use the latest technology relating to faster connection and download times. Some existing ATMs may be upgraded through the installation of computer software to enable processing of a user's order for goods or services as discussed herein. Furthermore, an automated transaction machine may be customized through programming by an administrator, such as a retailer or merchant, to limit or control browsing to specific web sites or other remote access. These specific web sites may pay a fee to the administrator of the machine in exchange for their accessibility.

Embodiments may find applicability to numerous types of situations and may be used to facilitate the tracking of transactions in the entertainment, education, gaming, investment, merchandising and banking industries.

Alternative embodiments may provide for facilitating the delivery of goods or services within an establishment. For example in establishments where patrons commonly encounter waiting time, embodiments may be used to speed delivery of goods or services. For example in popular restaurants during busy periods, patrons may be required to wait a substantial time to be seated at a table. Subsequently once the patrons are seated they then must place their order and wait a further period to receive their food. Such waiting time may be reduced by providing a restaurant web site which includes menu items and enables patrons to place their orders online through an ATM. The patrons can also pay for their food order at the ATM via debit card, credit card, cash, check or other payment method. Variable items such as gratuities may be waived for online payment or a standard gratuity charge may be added.

In an exemplary embodiment, in response to placing their order online through the web site, the user receives an indicator such as a receipt identifying their order and the fact that it has been paid for. The indicator may be in the form of a traditional paper receipt with a numerical or other indicator or indicia that identifies the order. Alternatively the indicator may include additional information such as all the items that have been ordered by the patron. The restaurant's web site in the exemplary embodiment is connected to a system in the kitchen so that the patron's order can be started at the appropriate time. A computer system in operative connection with the web site may also receive inputs through manual input devices or other devices to monitor the seating of patrons in the restaurant so that the patron's order is not started too early. As a result in the exemplary embodiment the patron's order is generally ready to be delivered tableside at approximately when the patron is first seated at their table. This speeds the flow of patrons through the restaurant enabling more people to be served in a timely manner. In the exemplary embodiment if the patron wishes to order additional items such as beverages, desserts or other things that were not included with the original online order, a separate check may be provided and paid for in the traditional manner.

In further alternative embodiments the restaurant web site may be accessible through the Internet by PCs, cell phones or other devices. This enables patrons to place orders for items online from their home or office. Patrons can also pay for such items via credit or debit card or other option that enables payment through a computing device which does not accept cash. In some embodiments the web site may further enable a user to indicate when they expect to arrive at the restaurant. In this way the user may schedule their arrival at the restaurant at a time when their order is about ready to be served. Alternatively or in addition the web site interface may be configured to advise the user of the earliest time that the order could be delivered based on the current number of patrons at the facility. In this way the patrons can place their order and plan to arrive at the restaurant at approximately the time when the order is ready to be served. As can be appreciated in some embodiments the restaurant web site may be combined with the reservation system enabling patrons to remotely make reservations and place orders several days in advance. In addition in an exemplary embodiment because the restaurant has already received payment for the items ordered, the probabilities of a patron not arriving at the restaurant to receive their order is reduced.

Some embodiments may provide considerable detail to the web site concerning specials, recommendations and other information that may be helpful to prospective patrons. Information as may normally be provided by a waiter or waitress concerning food items may likewise be posted on the web site. Further, the ability to take reservations and orders online may facilitate planning by the establishment for demands for food items and reduce the risk that the restaurant will run out of specials or other items that are popular with patrons. Further, exemplary embodiments may provide incentives for advance payment and/or payment with cash at the ATM.

It should be understood that while the exemplary embodiment discussed above concerns a food service establishment, the principles discussed can be applied to other types of establishments. Such establishments may include those where the amount of waiting time encountered by a user may be significant depending on the number of patrons at the facility. Embodiments may also find particular applicability in environments where the goods or services delivered must be customized, configured or assembled together in groups or sets to suit the needs or requirements of the particular user.

In some alternative embodiments the principles of exemplary embodiments may be applied to a system and method in which an automated banking machine is operated to deliver noncurrency certificates that are redeemable for goods or services. In some exemplary embodiments this may include for example certificates that are redeemable for goods or services at the option of the bearer of the certificate, from a plurality of merchants located in a particular shopping area such as a mall. Further in some exemplary embodiments the certificates may comprise gift certificates of a type that may be provided by a purchaser of the certificate to another person. That person may then use the certificate to acquire goods or services as the recipient desires from the affiliated merchants.

In an exemplary embodiment an automated banking machine and connected systems and networks of the type previously described may be used. In some embodiments the cash dispenser or one or more modular dispenser components of a media dispenser in an ATM may be loaded with gift certificates that have been preprinted and which have a given redeemable face value. For example the machine may be located in a mall and the gift certificates may be printed so as to indicate that the certificates are redeemable by the merchants that are located in the mall for the goods or services such merchants provide. In some embodiments the machine may operate to conduct transactions in which cash is dispensed as well as to dispense one or more gift certificates at the option of the consumer operating the machine. In alternative embodiments the machine may include a printer device and certificate stock material which may be paper, cardboard or other suitable material. In such embodiments the computer in the machine may be programmed so as to enable the printing of gift certificates on demand within the machine and to dispense certificates to a user. In such embodiments one or more printers located within the machine may operate to print the associated value on the certificate stock and/or to otherwise print or apply indicia so as to create a valid and/or redeemable certificate prior to the dispense thereof by the machine. Of course in some embodiments certificates may be printed outside the machine, loaded into storage areas in the machine and dispensed in the course of transactions.

In operation a user operating the machine may provide appropriate instructions and identifying inputs to the machine so as to identify the user and/or an associated financial account. The user may also provide inputs to select a transaction including the dispense of gift certificates. The machine then operates in accordance with its programming to cause the appropriate gift certificates to be dispensed and to cause the user's account to be assessed the associated charge. Further the machine may operate in accordance with its programming to cause the associated charge allocated to the user's purchase of the gift certificates to be credited to the account of an entity such as the administrator which may be the mall operator who bears responsibility for reimbursing merchants who redeem the certificates. Such an account is alternatively referred to herein as an accrued value account. This may be done for example by sending appropriate messages from the machine through the network so as to cause the transfer of the funds debited from the consumer's account to the mall operator.

In some alternative embodiments in which the automated banking machine includes a cash accepting device, the machine may be programmed so as to operate to accept cash in payment for gift certificates. In such embodiments the user may provide appropriate inputs so as to indicate that they are electing a cash payment option. Thereafter the machine operates in accordance with its programming to enable operation of a cash accepting device and an associated valuation device to determine a value associated with the cash input by the user. In response to the acceptance of such cash value, the machine is operative to dispense the appropriate value of certificates.

Still other embodiments may apply the principles previously discussed in which a person wishing to obtain gift certificates may specify their order therefore at a remote PC or other connected terminal. Thereafter the person electing to purchase the gift certificates may utilize a code or other identifying input used in connection with the initial process to operate the automated banking machine so as to recover the data related thereto. Thereafter the user of the banking machine may utilize a suitable form of monetary value payment to input to the machine such as a credit card, debit card or cash for purposes of paying for gift certificates. Upon payment of the appropriate monetary value, the gift certificates are then dispensed.

In some alternative embodiments, apparatus and systems may be operated so as to enable providing such certificates without the physical delivery of the gift certificates to the purchaser thereof. This may include, for example, a person wishing to give the gift certificates purchased to a third party. In some embodiments this may include purchasing such certificates remotely from a PC or other connected device via an Internet connection. This may include the purchaser of the certificates making payment therefore via credit card, debit card or other noncash payment method. In exchange for making payment, the person purchasing the certificates may be provided with a code or other identifying indicator which corresponds to such purchaser's rights to obtain such gift certificates. Thereafter the purchaser of the gift certificates may transfer the code or other identifying indicator to the individual who the purchaser intends to receive the particular certificates. Such an individual may thereafter go to the machine located in the shopping area and by providing appropriate inputs, including the identifying indicator, receive from the ATM the dispense of the gift certificates corresponding to the amount paid for them by the person who originally purchased them. Of course as can be appreciated the code or other identifying indicators associated with such gift certificates may be provided in various forms and delivered in various manners to the intended recipient. This may include for example various physical and/or electronic forms of the identifying information.

In some examples the merchant web site for ordering such gift certificates may include the capability to automatically dispatch a greeting card to the intended recipient, which greeting card may include the authorization code or other indicia. Such a greeting card may be a suitable hard copy greeting card sent by mail, and may include in some embodiments features selected by the person making the gift certificate purchase during the online session in which the gift certificates are purchased. In alternative embodiments such codes may be included in an electronic greeting card or other suitable delivery form for an intended recipient. Of course these approaches are exemplary and in other embodiments other approaches may be used.

When a recipient obtains the gift certificates they can then be used as the recipient desires in accordance with the applicable terms thereof by redeeming the certificates for goods or services provided by one of the affiliated merchants. The affiliated merchants then provide the redeemed certificates or other suitable information related thereto to the mall operator or other administrator entity who is responsible for reimbursement of the merchants who are redeeming the certificates. Reimbursement is thereafter made by the mall operator or other entity in an amount that represents at least a portion of the face value of the gift certificates. As can be appreciated in some embodiments and methods retailers may be reimbursed at a discount from face value of the certificates so as to cover the cost associated with providing the certificates as well as the ATM used for self service dispensing of certificates and/or associated online purchase capabilities. In the alternative or in addition purchasers of such gift certificates may be assessed a service fee associated with the purchase. It should be understood that such approaches are exemplary and in other embodiments other approaches may be used.

In still other embodiments, an automated banking machine such as an ATM may be used in connection with gaming establishments and systems which are operatively connected to gaming machines. Such an exemplary system is indicated 150 in FIG. 8. In this exemplary embodiment, an ATM 152 is located in a gaming establishment schematically represented 154. Located within the gaming establishment are a plurality of gaming machines schematically represented 156. In exemplary embodiments, the gaming machines may comprise slot machines, electronic poker machines and other types of machines at which users can play one or more games in exchange for value. In addition in an exemplary embodiment, the machines are of a type at which a user can win the game and receive monetary value or other rewards as a consequence of winning. The exemplary gaming machines operate to carry out games for a user. Games have outcomes which can result in the user winning (in which case the user receives value) or losing (in which case the user loses value). Of course some gaming machines may provide numerous types of outcomes.

Figure 8:
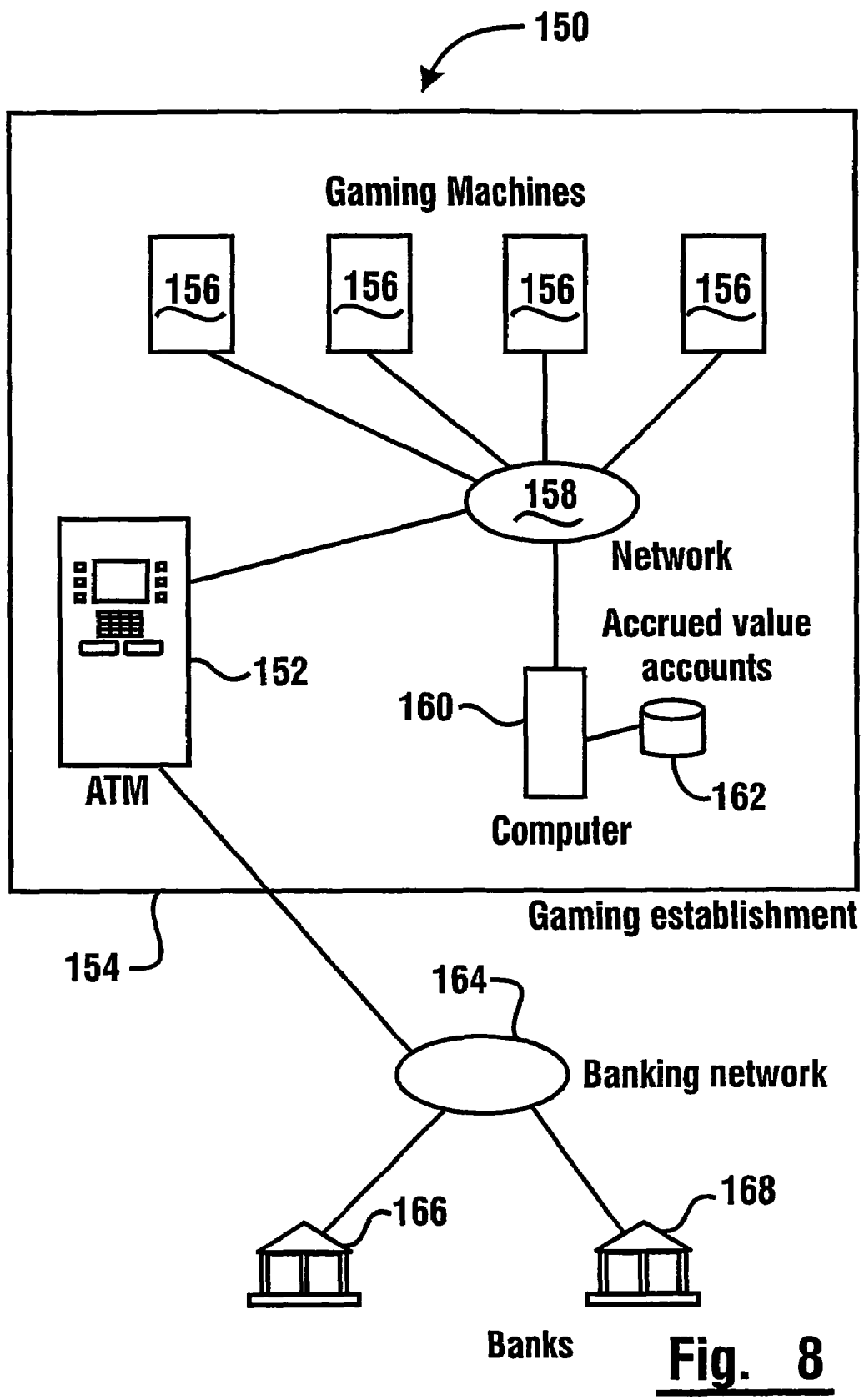
FIG. 8 is a schematic view of an automated banking machine operating in conjunction with gaming machines and an accrued value processing network in a gaming establishment.

As schematically represented in FIG. 8, the ATM 152 and the gaming machines 156 are operative connection through an accrued value processing network schematically indicated 158. The accrued value processing network may comprise a local area network that provides suitable communication within the facility between the gaming machines, the ATM and one or more computers or servers indicated 160. As schematically represented, at least one server 160 includes therein one or more data stores which are schematically represented 162. It should be understood, however, that the exemplary arrangement is but one of many that may be implemented for purposes of enabling communications between one or more ATMs, gaming machines and servers within gaming establishments. It should also be understood that although a local area network limited to the gaming establishment is shown, other embodiments may include networks having communications throughout a wider area, such as between multiple gaming establishments having the same ownership, management company or a relationship that facilitates gaming activities of patrons who may wish to be able to engage in gaming activity within a plurality of various gaming establishments.

As also represented in the exemplary embodiment, the ATM 152 is in operative connection with a banking network 164. The banking network may comprise one or more of the types of networks previously discussed that enable the ATM to conduct financial transactions with remote accounts such as checking accounts, savings accounts, credit card accounts or other accounts from or to which a user operating the ATM may transfer value. As schematically represented in FIG. 8, the banking network is in operative connection with multiple host banks 166, 168 and the computers therein, which enable the carrying out and tracking of their customers' financial transactions. Of course it should be understood that this schematic configuration is merely exemplary, and in other embodiments other approaches may be used. Further, in exemplary embodiments systems may carry out communications between the ATM and local or remote computers in a manner like that shown in U.S. Pat. No. 7,003,492, the disclosure of which is incorporated herein by reference.

Figure 9:
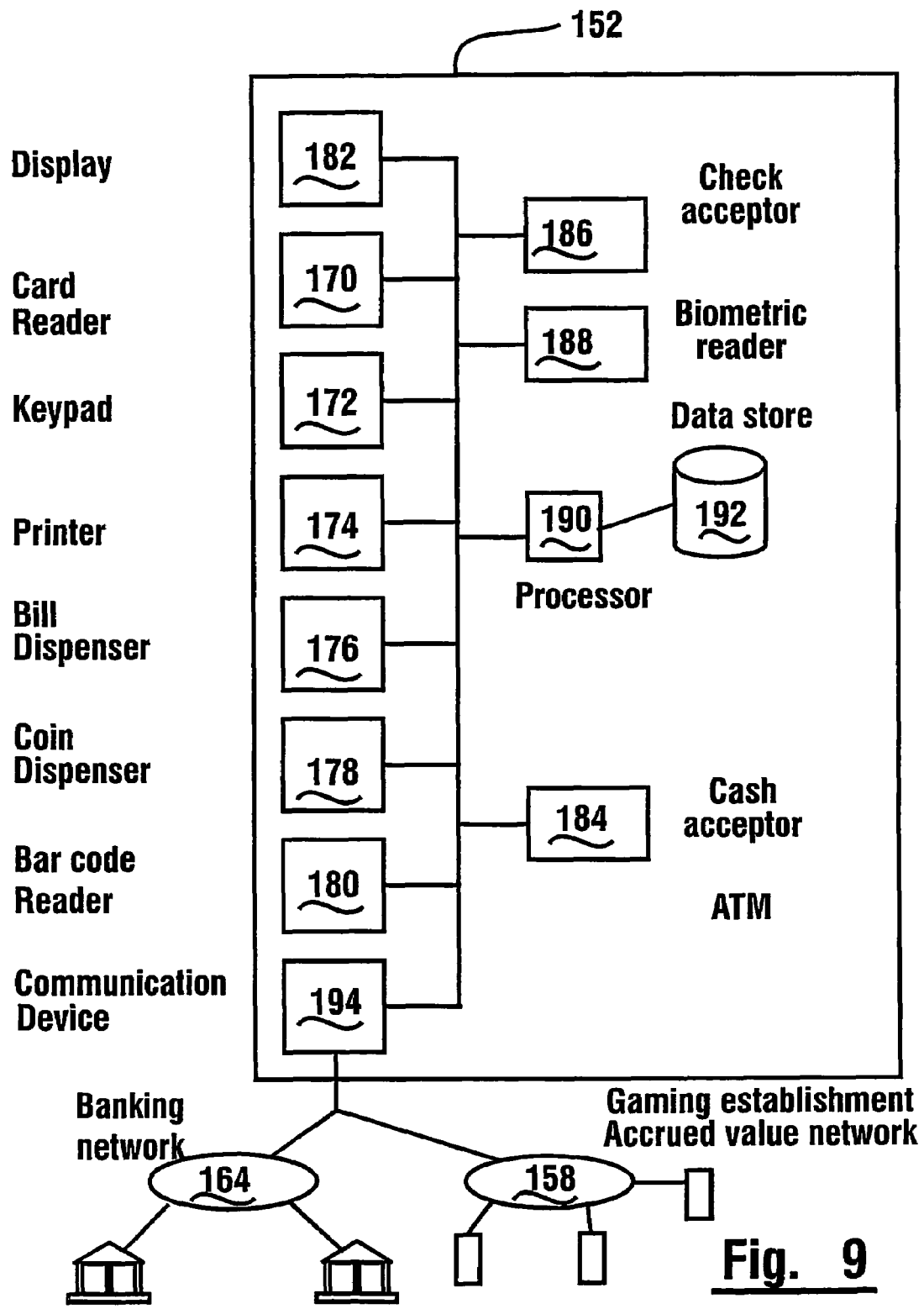
FIG. 9 is a schematic view of an exemplary automated banking machine of the type represented in FIG. 8.

FIG. 9 schematically represents components included in an exemplary ATM 152. It should be understood that the exemplary ATM may include one or more structures, features, housings and components of the type shown in U.S. Pat. Nos. 6,983,879; 6,997,375 and/or 6,981,638, the disclosures of each of which are incorporated by reference. Of course these ATM structures and features are merely exemplary of those that may be used.

As shown in FIG. 9, ATM 152 includes in supporting connection with its housing a plurality of transaction function devices. The transaction function devices in this exemplary embodiment include a card reader 170. Card reader 170 may be of a type suitable for reading magnetic stripe cards, smart cards, radio frequency identification (RFID) cards, or other type cards (or other devices such as a portable phone that can deliver data of a type that can be read from a card), that include readable data thereon that can be read and used to identify a user and/or the user's financial account. In an exemplary embodiment, ATM 152 includes a card reader that is operative to read data from credit and/or debit cards. The exemplary ATM also includes a keypad 172. Keypad 172 includes a plurality of keys that can be manually actuated by a user to provide inputs to the ATM. Although schematically the keypad 172 is shown as a single item, embodiments may include a plurality of keys such as function keys for providing manual inputs, as well as a keypad. In addition or in the alternative, embodiments may also include a touch screen or similar input device that carries out the functions of a keypad or other manual input device.

The exemplary ATM 152 includes at least one printer schematically represented 174. In the exemplary ATM, the printer 174 is operative to print items such as transaction receipts. In addition in the exemplary embodiment, the printer 174 is operative as later discussed to print items such as gaming tickets that include machine readable indicia thereon, such as a bar code. In alternative embodiments the ATM may include a plurality of separate printers rather than a single printer for performing these functions. This may include, for example, a separate printing device for receipts related to transactions conducted and a separate mechanism in connection with the machine for printing items such as gaming tickets. In still other alternative embodiments the machine may include additional printers. This may include, for example, an internal journal printer for printing a record related to transactions at the machine.

The exemplary embodiment includes a bill dispensing device schematically represented 176. The bill dispenser 176 is selectively operative to dispense currency bills from the machine. The bill dispenser in some embodiments may include features of U.S. Pat. No. 7,000,832, the disclosure of which is incorporated herein by reference. In the exemplary embodiment, the bill dispenser is operative to selectively dispense several denominations of bills as may be desirable for dispensing to ATM users the amount of money as may be requested by a user or as may be associated with an accrued value account associated with a user's gaming ticket. It should be understood that in some embodiments the bill dispenser may include features of bill dispensers or bill recycling units of the type described in other disclosures that are incorporated herein.

Exemplary ATM 152 also includes a coin dispenser 178. Coin dispenser 178 is selectively operative to dispense coin in various denominations to users of the ATM. In some exemplary embodiments, the ATM is operative to dispense coins so that an exact amount is delivered to a user as separate coins. This enables the ATM to provide to a user change in exact amounts down to the penny in some embodiments. Alternatively, some embodiments may operate to round the amount delivered in coin to a user to a most convenient coin size, such as the nearest nickel or dime amount. Some embodiments may also include coin dispensers that are operative to provide large numbers of coins to users. This may be done through the same or a separate coin dispenser. In still other embodiments, coin dispensers may operate to deliver rolled coins to users. This may be desirable in some embodiments where the ATM is located in gaming establishments that have gaming machines that accept coins such as quarters. ATM users in such establishments may find it desirable to obtain significant numbers of the particular type of coin that can be accepted by the gaming machines. Alternatively or in addition, some embodiments may be operative to dispense tokens which may have some characteristics of coins, such as a round shape, which can be used in gaming machines of the particular establishment. Of course, these approaches are exemplary.

The exemplary ATM 152 includes a code reading device 180. Code reading device 180 of an exemplary embodiment includes a bar code reading device. The bar code reading device may operate to read single or multidimensional bar codes on items presented to the machine. In an exemplary embodiment the code reading device is operative to read machine readable indicia in the form of bar code that is included on gaming tickets that are accepted by and produced by gaming machines within the establishment. In alternative embodiments, other types of code reading devices may be used as may be desirable for the particular type of activity which occurs in the establishment where the ATM is used.

This may include, for example, a code reading device that is operative to read RF back scatter devices or RFID tags. In some embodiments such devices may be used to provide the machine readable indicia that is used to track particular gaming items and their value. In other embodiments, other types of tokens, items, or devices which include unique identifying information may be used to track activity and be associated with an accrued value account. The ATM may include one or more code readers of a type suitable for reading any of such items as may be required for its operation.

In the exemplary embodiment the ATM includes a display 182. Display 182 of the exemplary embodiment comprises a visual display which includes a CRT or LCD screen which is operative to provide visual outputs to users of the machine. The display may be used to provide ATM users with instructions for operating the machine. Alternatively or in addition, the display may be used for other purposes such as providing promotional advertising, public service announcements, gaming information such as odds or instructions how to make bets, directions to areas within the facility such as the cashier's cage, or other information. It should be understood that in some embodiments the display 182 may include a touchscreen function such that the display may serve as both an output and an input device for the machine. Of course embodiments may include other devices as well. These may include, for example, speakers, headphone jacks, wireless output devices, cell phone calling devices or other devices suitable for communicating with users of the machine.

The exemplary ATM also includes, in supporting connection with the housing, a cash acceptor 184. Cash acceptor 184 may be of a type that is operative to accept currency bills from users of the machine. This may include, for example, devices of the type shown in U.S. Pat. No. 6,983,880, the disclosure of which is incorporated herein by reference. Also, as previously discussed, cash acceptors may include devices of a bill recycling type that accept and validate bills and can also dispense bills to users of the machine. In still other embodiments the ATM may include cash acceptors that accept coin or items of value such as tokens. Such cash acceptors may be useful when the ATM is used in an establishment where coins or tokens are used to operate gaming machines or other devices. Such features may also be particularly useful where gaming machines pay winnings in coin or tokens which a user may find cumbersome to carry on their person. Of course these approaches are exemplary, and in other embodiments other approaches may be used.

The exemplary ATM also may include a document accepting device for accepting other types of documents in the machine. This may include, for example, a check accepting device schematically represented 186. The check acceptor 186 may be of a type described in the disclosures previously incorporated herein. Alternatively, the device may be of a type described in U.S. patent application Ser. No. 11/324,835 filed Jan. 3, 2006, and/or U.S. patent application Ser. No. 11/370, 525 filed Mar. 8, 2006, the disclosures of each of which are incorporated herein by reference. Check acceptor 186 may be operative to read indicia included on checks or other documents. The check acceptor 186 may also be operative to produce image data corresponding to the particular documents. Further, in some embodiments the function of the code reading device 180 and the document accepting device 186 may be combined in a single device. For example, in some embodiments a device in the ATM may be suitable for accepting gaming tickets and reading the machine readable indicia thereon, as well as reading and analyzing the indicia included on checks. The devices of the incorporated disclosures may be suitable for these purposes in some embodiments. Of course these approaches are exemplary, and in other embodiments other approaches may be used.

Exemplary embodiments may also incorporate in the ATM 152 other devices. Such devices may include, for example, a biometric reading or sensing device schematically represented 188. The biometric reading device 188 may in some embodiments include a device for reading biometric features of users. This may include, for example, fingerprint readers, iris scanners, voice analysis devices or other devices which can receive and analyze features to identify a particular user. In still other embodiments the biometric reader 188 may include an imaging device such as a camera which operates in conjunction with facial recognition software or other software that can identify a user by appearance features. Of course these devices are exemplary of devices which may be used in connection with the ATM 152 to sense and identify features that are associated with a particular user.

The transaction function devices of the exemplary ATM are in operative connection with one or more processors schematically indicated 190. Processor 190 is in operative connection with one or more data stores 192. The processor 190 is operative to execute instructions which are stored in one or more data stores to cause the ATM to carry out transactions. The instructions which are executed by the processor may be resident in the machine or stored on media of types suitable for bearing computer executable instructions. These may include, for example, disk drives, solid state memory, memory cards, CDs, DVDs, flash memory, or other types of suitable magnetic, optical or other storage media upon which computer executable instructions may be stored.

The at least one processor is in operative connection with at least one communications device schematically represented 194. The communications device can be one or more of the types previously discussed that enable the ATM 152 to communicate with other computers. In the exemplary embodiment the ATM 152 communicates in the accrued value processing network 158 as well as with the banking network 164. Of course other embodiments may communicate in other or different networks and with other or different entities of the types previously discussed herein.

It should be understood that the ATM 152 is an exemplary embodiment. Other embodiments may include other, different or lesser numbers of devices. Other embodiments may also perform additional, different or lesser numbers of functions than the exemplary embodiment. In addition, as previously discussed, in some embodiments certain functions performed by the exemplary embodiment may be combined such that a single device may perform functions of a plurality of the described devices. Likewise, in other embodiments a plurality of devices may be used to perform functions described as being performed by a single device. The nature of the ATM used will depend on the particular circumstances in which it is operated.

In some exemplary embodiments, the ATM 152 may be operated by customers to perform banking transactions. A user initiates a banking transaction by inserting a card which includes indicia thereon that is read by the card reader. The indicia on the card includes data which corresponds to the user and/or one or more of the user's account or other data that can be used to enable a user to carry out a transaction. In some transactions the user may also be required to input another identifying input such as a personal identification number (PIN) through the keypad. Alternatively or in addition, the user may input a biometric input through a biometric reader 188. The nature of the input provided by the user may depend on the type of transaction and/or network in which the machine is operated.

The user in conducting a banking transaction will respond to instructions provided by the machine through its display or other output device to indicate the type of transaction that the user wishes to conduct at the machine. These transactions may include, for example, receiving cash from a particular account, making a deposit to a particular account, or making an inquiry as to the balance that the user has in a particular account. In an exemplary embodiment, other transactions may also be selectable by a user. These may include, for example, inputting a check through operation of the check acceptor 186. Checks may be accepted for purposes of withdrawal or cashing a check. Alternatively, exemplary transactions may include depositing cash through the cash acceptor to the user's account. Alternatively, transactions may include changing denominations of bills or coins for other types of currencies. In some embodiments transactions may also include receiving or redeeming gaming tickets or other items that include machine readable indicia. The transactions available depend on the programming associated with the one or more processors 190, as well as the system in which the ATM is used.

Figure 10:
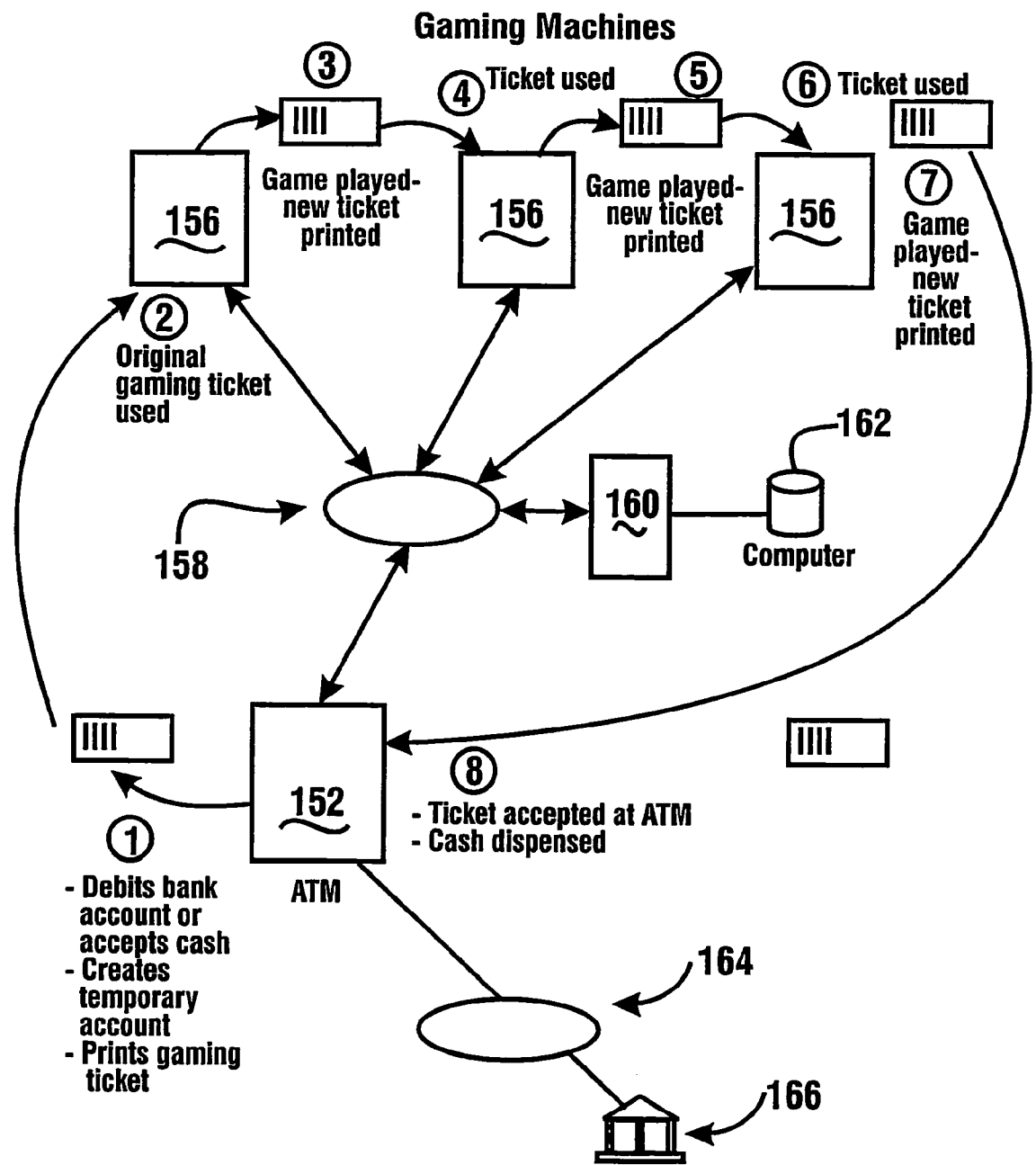
FIG. 10 is a schematic view showing an exemplary process through which the automated banking machine may dispense and redeem items including machine readable indicia that are used in connection with gaming machines in a gaming establishment.

In situations where the requested transaction involves an account of the user that is accessible through the banking network 164, the at least one processor in the ATM is operative to cause the ATM to communicate through the appropriate communications device 194 and the banking network 164 with a user's account. This is schematically represented in FIG. 10 by communication of the ATM 152 with a host bank 166.

If the transaction that the user is seeking to conduct involves a withdrawal from a user's account, one or more computers operative with the host bank 166 determines if the user is authorized to conduct the requested transaction and communicates responsive information through the banking network 164 to the ATM. Likewise, if the user at the ATM is requesting to deposit funds into an account, the host banking system determines if this is authorized and returns a response indicating its determination. Similar functions are carried out responsive to other types of transactions that may be conducted with regard to the user's account, such as a balance inquiry, check cashing or other functions that are available at the ATM. It should be understood that the reference to an account being held by a host bank is merely exemplary. For purposes of this disclosure, a host bank may include any entity which is operative to authorize financial transactions from an account associated with a user.

Responsive to the communications with the host bank 166, the ATM is then operative to perform in accordance with the responsive instructions from the host bank. For example, if the user has requested to withdraw funds from an account and the transaction is authorized, the ATM will then perform in a manner to complete the requested transaction. For example, if a user has requested a transaction which includes the dispense of cash, based on the withdrawal the at least one processor 190 will operate to cause the bill dispenser 176 and/or coin dispenser 178 to operate to dispense the desired amount of cash from the ATM. Of course as previously discussed, in some embodiments the user may provide instructions so as to designate the denominations of bills or coin that they wish to receive. Likewise, if the user has requested to conduct a transaction including a deposit, the ATM operates to receive the deposit in the form of cash, check or other item that the ATM may receive from the user. It should be understood that in some embodiments the ATM may be operative to validate the authenticity of deposited items such as with a currency acceptor, check acceptor or other analysis device. In other embodiments the user may provide inputs so as to indicate the nature of the deposit without machine verification thereof. This may include, for example, deposits made to the machine through deposit envelopes.

Likewise, the exemplary embodiment may enable the carrying out of check accepting or check cashing transactions through operation of the check acceptor 186. This may be accomplished by the ATM in ways similar to those described in the incorporated disclosures. Further, in some embodiments the ATM may operate to accept cash equivalents such as chips or gaming tokens used in the establishment, and enable the user to deposit the value thereof directly in their accounts that are accessible through the banking network. Of course these transactions are exemplary of those that may be conducted in various embodiments.

When the ATM has carried out the transaction as requested by the user, the ATM in some embodiments will communicate through the banking network 164 to the appropriate host bank 166 information indicative that the transaction was carried out. This enables the computer associated with the host bank 166 to debit or credit the user's account according to the transaction.

Exemplary ATM 152 may also be operated in accordance with its programming to communicate in the accrued value processing network 158, which is connected to server 160 and other devices within the gaming establishment. This enables the exemplary ATM to be used to facilitate the gaming activities that are carried out in the establishment in which the ATM is located or in a related or separate gaming establishment which is operatively connected to the accrued value processing network to which the ATM is operatively connected.

In an exemplary embodiment, the ATM is operated in an establishment that includes gaming machines 156. The gaming machines operate in response to items such as gaming tickets that include machine readable indicia. The gaming machines of the exemplary embodiment are also operative upon completion of game playing activity to produce an item including machine readable indicia that indicates a value which a user has as a result of the gaming activity. This may include, in an exemplary embodiment, gaming tickets which include bar code which identifies the particular ticket and/or the value associated therewith.

In the exemplary embodiment, the one or more servers 160 connected in the accrued value processing network are operative to track the gaming tickets using the machine readable indicia corresponding to one or more codes as well as the monetary value associated therewith. Because in the exemplary embodiment the server 160 is in operative connection with each of the gaming machines, data records corresponding to accrued value accounts may be stored in one or more data stores 162. Each of the accrued value accounts may be associated with the machine readable indicia associated with each gaming ticket. Each of the accrued value accounts may also have associated therewith the monetary value which corresponds to the gaming ticket and its machine readable indicia.

Further, in an exemplary embodiment, the at least one server 160 is operative to track and maintain records of the accrued value accounts, including the depletion of such accounts when a gaming ticket is deposited in a gaming machine for purposes of playing the game that is carried out by that gaming machine. Thereafter in an exemplary embodiment, once the one or more games has been played and the value that a user had associated with his original gaming ticket is reduced due to losses or increased due to winnings, the at least one gaming machine is operative to produce a new gaming ticket including machine readable indicia that corresponds to the value associated therewith. Communication between the gaming machine and the at least one server 160 is operative to cause the server to establish at least one data record associated with an accrued value account that corresponds to machine readable indicia on the gaming ticket produced by the gaming machine, and the value thereof. Of course this approach is exemplary, and in other embodiments other approaches may be used.

An exemplary alternative approach may use different types of tokens or items instead of disposable items such as gaming tickets. Such items may include cards with RFID identifiers, smart cards including processor chips, pendants including machine readable identifiers, or other items which have machine readable indicia and which may remain generally in the possession of the user as the user is involved in gaming activities. In some embodiments, the gaming machines may be operative to change data stored as machine readable data on the particular item, responsive to the user's winnings and losses at various gaming machines. Each of the gaming machines may include devices for reading such items and reprogramming the items with data accordingly. In such systems, communication between the gaming machine and the at least one server 160 in the accrued value processing network is operative to track the value associated with the particular item. In such embodiments, the server 160 may also be operative to associate the data corresponding with the particular item and the particular user who uses the item to conduct gaming activities. This enables the at least one server 160 to perform other functions. These other functions may include, for example, targeted marketing, providing benefits and premiums to users, and/or minimizing the risk of fraudulent activity. In some embodiments the ATM may utilize the principles described in U.S. Pat. No. 7,039,600 the disclosure of which is incorporated herein by reference. Of course these approaches are merely exemplary of functions that may be carried out responsive to processing of data by the at least one server.

In still other exemplary embodiments, users may use items including machine readable indicia in the form of data which can be associated with a particular accrued value account. The gaming machines and/or ATM will each include a reader for reading indicia on such items. In such circumstances, the particular data included on the item may not be changed responsive to gaming activity. Rather, the at least one server may maintain an account associated with the particular item and/or user. Further in some embodiments the data associated with the user's accrued value account may be a biometric feature. This may include, for example, one or more fingerprints, iris scan data, retina scan data, voice print, face print or other biometric data or combinations thereof. The account may be adjusted through operation of the at least one server to reflect the user's winnings or losses through adjustments to the record in the at least one data store. This approach may avoid the need to have the gaming machines include devices which produce and/or modify gaming tickets or other items held by the user. Of course these approaches are exemplary.

In still other embodiments, the gaming machines or items associated therewith may include verification devices to help minimize the risk of fraud or theft in connection with the use of gaming tickets or other items that represent value. These may include, for example, biometric readers in operative connection with one or more of the gaming machines. In such embodiments a biometric identifier may be sensed and stored in the at least one data store 162 in operative connection with one or more of the server computers 160 in the network. The biometric identifier may be stored in correlated relation with data corresponding to the particular gaming ticket and/or the machine readable indicia thereon, or other identifying data associated with a gaming item. In some embodiments the particular gaming item may only be used or redeemed for cash or other value, if the user seeking to use or redeem the item corresponds to the stored biometric data. Approaches of this type may be used to minimize the risk of theft or counterfeiting of gaming tickets or other items.

It should be understood that these approaches are exemplary of approaches that may be used.

In an exemplary embodiment, the ATM 152 is operative to enable a user to redeem gaming tickets for cash or other value. In an exemplary embodiment, the ATM operates in accordance with its programming to enable the user to conduct a transaction in which a gaming ticket is presented to the ATM. The gaming ticket has machine readable indicia thereon which is read by the code reading device 180. In the exemplary embodiment, the ATM is operative to receive the gaming ticket into the machine for purposes of reading the indicia. However, in other embodiments certain reading devices that can read indicia from an item that is external of the ATM housing may be used.

The ATM operates in accordance with its programming to communicate data corresponding to the machine readable indicia corresponding to one or more codes read from the item to the one or more servers 160 in the accrued value processing network. The at least one server is operative to determine the amount in the accrued value account associated with the particular code of codes represented by the machine readable indicia. If the machine readable indicia corresponds to a current accrued value account, and such account includes a value amount associated therewith, the at least one server communicates one or more messages to the ATM, which indicates that the ticket can be redeemed for value, and the amount thereof. Of course if the gaming ticket is invalid or is otherwise not suitable for being redeemed, the messages from the at least one server to the ATM will so indicate.

Responsive to the at least one server indicating that the gaming ticket is suitable for redemption, the at least one processor operates in accordance with its programming to provide value to the user. The exemplary embodiment also operates, responsive to redeeming the gaming ticket, to retain the ticket in a storage location within the machine.

In some exemplary transactions, the user will indicate through inputs to the machine that the user wishes to redeem the gaming ticket for cash. In that case, the at least one processor 190 in the ATM will operate to cause the bill dispenser 176 and/or coin dispenser 178 to operate to dispense cash to the user. In some embodiments the cash dispensed may pay the user to the penny. In other embodiments, as discussed, the machine may operate to round the amount to a particular value that can be provided by the machine through the dispensing of the available bill and coin denominations.

In still other embodiments, the ATM may operate in accordance with its programming to redeem gaming tickets for value in other ways. These may include, for example, enabling the user to deposit the value in an account that is accessible through the banking network. In such cases, the user transaction at the ATM may include reading a card associated with the user's account, which includes data which enables the ATM to communicate through the banking network and deposit the redeemed funds in a financial account associated with the user. In some embodiments, the at least one processor 190 in the ATM may operate to enable the user to conduct transactions in which a portion of the value from the gaming ticket is deposited in an account of the user accessible through the banking network while another portion is provided in another form. The other form may include cash, gaming tokens, gaming tickets, vouchers for goods or services, or other items that are dispensable by the machine. Of course these approaches are exemplary.

In still other exemplary embodiments, the ATM may operate in accordance with its programming to only provide value in the form of cash or gaming tickets, tokens or chips in redemption transactions meeting certain parameters. These parameters may include, for example, transactions under a certain value amount or that meet other programmed criteria. For example, if the gaming ticket that a user wishes to redeem is above a certain specified value, the at least one processor in the ATM may operate to cause the ATM to provide outputs to the user that direct the user to the cashier cage at the gaming establishment. Such an approach may be desirable in some embodiments to avoid premature depletion of available bills or other items that are stored in the ATM. Such an approach may also be desirable in some cases where there is concern regarding possible fraud or theft of gaming tickets. Of course in such circumstances the ATM may operate in accordance with its programming to perform other functions. These functions may include the capability to redeem the user's gaming ticket and provide a check or voucher that can be redeemed at a cashier cage or in another location within the gaming establishment or other facility. In some embodiments the at least one server or the ATM is operative to calculate taxes on a user's winnings and to make deductions therefrom. The user may be provided with an amount reduced for tax withholding from the ATM. The ATM may also be operative to print and provide the user with a tax withholding form showing taxes withheld. Of course these approaches are merely exemplary.

The functions described in connection with the redemption of gaming tickets may also be used in connection with other types of items that are used in connection with the operation of gaming machines. These may include, for example, items of the type previously discussed such as RFID tokens, smart cards, pendants or other items which include machine readable indicia that can be read by the code reading device installed in an ATM. As previously discussed, these items may include the capabilities of changing the indicia on the item through operation of the gaming machines so as to indicate value thereon. Alternatively, or in addition, the items may include more permanent data which is used by the accrued value processing network to track the particular value associated with the machine readable indicia and data readable from the particular item. Such items may also comprise biometric data that is used in lieu of other machine produced items. Alternatively or in addition machine produced items may have biometric or other identifying data associated with the accrued value account records stored in the at least one data store 162 to help minimize the risk of fraud. Of course it should be understood that in at least some embodiments where the item includes changeable data representative of value, the ATM may include in operative connection with at least one processor, a suitable device for changing the data included on the item so as to indicate that the value associated therewith has been eliminated or reduced as a result of total or partial redemption thereof. Of course in some embodiments the item may be captured by the machine in a manner similar to that described in connection with gaming tickets. In other embodiments the particular item may be retained by the user for use in the future in connection with gaming or other activities.

In still other exemplary embodiments, the ATM 152 may be operative to provide gaming tickets or other items which can be used in connection with the operation of gaming machines. For example, the ATM 152 may operate in an exemplary embodiment to cause value to be withdrawn by a user from a banking account accessible through a network, and to apply such value to the purchase by the user of one or more gaming tickets. In such embodiments the ATM operates in accordance with its programming to print at least one gaming ticket that includes machine readable indicia thereon. In such a transaction the ATM is also operative to communicate with the at least one computer server 160 in the accrued value processing network, to indicate the transaction associated with issuing a gaming ticket. The at least one server 160 is operative to establish at least one record in the at least one data store 162, associating the machine readable indicia that is printed on the gaming ticket and the amount of value associated therewith. Of course, in some embodiments the at least one server computer 160 may also be operative to store additional information in such records, including information about the user's banking account, the user or other information that may be appropriate or desirable to be tracked in connection with the accrued value processing system.

In other alternative embodiments, the ATM 152 may be operative to issue gaming tickets responsive to other sources of value that are received or accessed by the ATM. These may include, for example, currency deposited as bills or coin in appropriate cash accepting devices within the ATM. The ATM may operate in accordance with its programming to issue gaming tickets including machine readable indicia in response to such items. Of course, in such embodiments the ATM is operative to communicate with the at least one server computer so as to establish the records necessary for the tracking of the dispensed gaming ticket.

In still other exemplary embodiments, the at least one ATM may be operative to receive other value, such as checks, from a user. This may be done, for example, by using the principles described in U.S. Pat. Nos. 7,137,551; 7,090,122; and/or 7,147,147, the disclosures of which are incorporated herein by reference. The machine may operate in accordance with its programming to communicate with the banking network or other external network to accept the check and provide a user with value therefore. Such value may include the dispense of a gaming ticket including machine readable indicia. Of course, the ATM in such circumstances may also operate in accordance with its programming to communicate with the one or more servers 160 so as to establish the records associated with the gaming ticket dispensed. The communications may also store in connection therewith information corresponding to the particular check cashed. For example in some exemplary embodiments, the at least one ATM may operate in accordance with the descriptions of the incorporated disclosures to produce data corresponding to an image of one or more sides of the check received into the ATM. The check may then be presented electronically into a settlement network so that the gaming establishment may promptly receive credit in its account for the value of the particular check. This approach may be used to facilitate check processing and reduce the risk that the check is later dishonored for insufficient funds. Of course these approaches are exemplary, and in other embodiments other approaches may be used.

In still other exemplary embodiments, the ATM may operate to produce items that can be used in gaming activities other than gaming tickets. These items may be items that are dispensable from the ATM. In still other embodiments, the ATM may operate with items associated with the user that include machine readable indicia that is changeable thereon. In such cases the ATM may include an appropriate device for changing the data on the particular item that is used in conjunction with the gaming machines so as to include data which is indicative of the amount of value that is associated therewith. Of course in still other embodiments of the type previously discussed, certain items and/or biometric identifiers used in connection with operating gaming machines may not necessarily have changeable data thereon. For processing transactions involving such items or identifiers, the ATM may operate to communicate to the at least one server 160. The server may operate to change the data included in the record corresponding to the particular item or identifier so as to reflect changes in the value thereof. Of course these approaches are exemplary.

FIG. 10 represents schematically the operation of an exemplary ATM 152 in a gaming establishment which includes gaming machines that operate in response to gaming tickets. These gaming tickets include machine readable indicia such as bar code. In the exemplary process described, the ATM 152 operates to receive value from a user in one of the ways previously described, and to print a gaming ticket including machine readable indicia thereon. This gaming ticket is delivered to the user. The ATM also operates in accordance with its programming to communicate through the accrued value processing network with the at least one server computer 160. The server computer is operative to create or modify a record included in at least one data store 162, including data corresponding to the machine readable indicia on the gaming ticket as well as the value associated therewith. For purposes of this disclosure, value associated with the machine readable indicia will be alternatively referred to as an accrued value account associated with the particular gaming ticket. Of course, as previously described, the at least one computer server 160 may also process and store other data associated with a gaming ticket. These may include, for example, user identifying data, time data, source of value data, check data (when a gaming item was paid for by cashing a check), bank account data (in cases where the item was purchased and value deducted from a bank account), user biometric data or other data that may be useful in the system.

The gaming ticket may be taken by a user to a gaming machine 156. In the exemplary embodiment, the gaming machine 156 accepts the gaming ticket and reads the machine readable indicia thereon through a reading device included in the gaming machine. The gaming machine which receives the gaming ticket communicates through the accrued value processing network with the at least one server 160. Communication with the at least one server is operative to determine if the gaming ticket is valid, as well as the value associated therewith.

Assuming that the gaming ticket is determined as valid, the server communicates with the gaming machine in a manner which authorizes the playing of one or more games at the machine. The user is enabled to operate the gaming machine 156 to play one or more games up to a time that the value associated with the gaming ticket is depleted. In the exemplary system, the gaming machines are operative to enable the user to optionally decide to cease playing the game at the machine in which the original gaming ticket has been deposited. When the user provides inputs to the gaming machine that the user wishes to cease playing, the gaming machine is operative to determine the amount that the user is entitled to receive. Of course, in some embodiments this may be done by the gaming machine, the server 160 or a combination thereof. Upon determination of the amount that the user is then currently entitled to receive, the at least one gaming machine is operative to produce a new gaming ticket including machine readable indicia thereon and deliver it to the user. This may be done by the gaming machine printing a new ticket with one or more codes thereon. The exemplary gaming machine is also operative to communicate with the at least one server so as to enable the at least one server to produce or modify at least one record in at least one data store. The exemplary record includes data corresponding to the at least one code corresponding to indicia on the gaming ticket and the accrued value account associated therewith.

It should be understood that, in some embodiments, each gaming machine may produce items with different machine readable indicia from the machine readable indicia on the gaming ticket that was originally deposited into the gaming machine when the user started playing games at the machine. In such embodiments the at least one server 160 is operative to cancel the accrued value account associated with the codes corresponding to the original machine readable indicia, and include records in the at least one data store corresponding to a new accrued value account associated with the new machine readable indicia. However, in other embodiments the data represented by machine readable indicia on the gaming ticket may be wholly or partially the same as that provided to the gaming machine. In such cases, the at least one server may be operative to update an accrued value account record for the previous ticket rather than create a different record corresponding to a different account. In still other embodiments, approaches may be used for tracking the redemption and issuance of gaming tickets. Such data may be particularly useful for analysis purposes to determine instances of fraud or malfunction in gaming machines.

Returning to the description of the exemplary operation shown in FIG. 10, the gaming ticket produced by the gaming machine, at the conclusion of the user's game playing activity at that machine, may be taken by the user to another gaming machine. The gaming ticket may be accepted in that machine for purposes of playing the games provided through that machine. Again, that gaming machine would communicate through the accrued value processing network to track the value associated with the input gaming ticket and the gaming activity. Upon the completion of the game playing activity at that machine, the exemplary embodiment causes that gaming machine to issue to the user another gaming ticket. The value associated with that ticket is increased or decreased depending on games won or lost at the machine. This process may be repeated until the user decides that they no longer wish to play games that accept gaming tickets and/or they wish to redeem their then-current gaming ticket for value.

When the user wishes to redeem a gaming ticket for value, the user may take the gaming ticket to the ATM. Presentation of the gaming ticket to the exemplary ATM causes the ATM to operate in accordance with its programming to enable the user to receive value for the gaming ticket. This may be done in one of the ways previously discussed. The user may provide one or more inputs to the ATM to choose transactions that are made available through the ATM. These may include, for example, the deposit of value in an account accessible through the banking network, receipt of bills, coin, other gaming items, or to conduct other transactions. Of course these approaches are exemplary of transactions that may be conducted.

In still other exemplary embodiments the gaming machines may operate to read a user's biometric feature such as a fingerprint, iris scan, hand scan, voice print or combinations thereof. In such an exemplary embodiment the accrued value of the account is associated in at least one data store with one or more data values that are produced by processing the readable biometric features. In such exemplary embodiments the user may operate the gaming machines by enabling the machine to read the one or more biometric features. Such an approach may be useful in that it avoids the needs for machine produced items such as tickets in connection with operating the machines.

Further in some exemplary embodiments the ATM may include a biometric reader among its transaction function devices. The ATM may operate to enable a user to withdraw funds from one or more financial accounts, and associate such a value in at least one data store in the accrued gaming value network in association with data corresponding to the user's one or more biometric identifiers. Thus in some exemplary embodiments the user may associate value with the data corresponding to at least one biometric identifier at the ATM, and then use that value for game playing activities at various gaming machines operatively connected in the accrued value network. As previously discussed the outcomes of the game playing activities result in adding or reducing the data corresponding to value in the accrued value network associated with the at least one biometric identifier.

In further exemplary embodiments the ATM may be operative to enable a user to transfer value associated with the accrued value network to banking accounts or other accounts accessible through a financial transaction network. Further in exemplary embodiments the ATM may be operative to enable the user to redeem value in their accrued value account for cash or other value. This may be accomplished through the user providing to the ATM or other device the one or more biometric identifiers necessary to identify the user as being entitled to receive value from the accrued value account. Of course this approach is exemplary and in other embodiments other approaches may be used.

Further it should be understood that although the machine of the exemplary embodiment may be referred to as an ATM, other types of automated banking machines may operate using the principles discussed herein.

Although the exemplary embodiment has been described in connection with gaming systems, the principles may be applied to other types of systems in which an automated banking machine is used to redeem items for value or dispense items that can be used to receive goods or services. In addition, the principles described can be used in combination with those referred to in connection with other types of systems to provide the user with additional types of transactions.

In still other exemplary embodiments, ATMs may operate to dispense items other than printed tickets. For example in some embodiments, the ATM may include a card dispenser. The ATM may be operative to provide cards to a user in exchange for value. The ATM may be operative to include data representative of value on cards by encoding data on a magnetic stripe or computer chip resident on the card or through other methods. In some exemplary embodiments the card dispensed by the ATM may be taken to gaming machines and the value thereon applied to playing games at the machines. The data representative of value on the card may be incremented upwards or downwards based on winning or losing. In some exemplary embodiments the card may also be redeemed for cash at the ATM in a manner similar to tickets previously discussed. Of course this approach is exemplary.

In still other embodiments, certain of the principles previously described may be used in connection with ATMs and systems to facilitate the ability to receive cash in exchange for a check. Many people prefer to conduct transactions in cash for numerous reasons. Cash has the benefit of being accepted without the need for the operation of computer systems and devices. Cash is also useful in that it is not generally traceable as it moves from one person to another. The use of cash is also a necessity for persons who do not have bank accounts or who do not wish to use their accounts in connection with certain transactions.

A system 196 shown schematically in FIG. 11 represents an exemplary approach in which checks can be more readily redeemed for cash at ATMs. In the exemplary embodiment, checks are enabled to be redeemed for cash without the need for an ATM user to provide inputs to the ATM that directly correlate to the personal identity of the user presenting the check or the user's account. The exemplary system further enables a person who is presented with a check to verify that the check will be honored for the check amount. In this way the recipient of the check can minimize the risk that the check will be dishonored.

The exemplary system shown in FIG. 11 includes one or more ATMs represented 198, 200. In the exemplary embodiment, the ATMs are of the type previously described and may include a display for providing user instructions. The ATMs may also include at least one input device such as a card reader, key pad and function keys. ATMs of an exemplary embodiment also include a check reader which comprises a check imaging device of the type that is operative to receive a check and produce image data corresponding to visual appearance of the check. The exemplary ATMs also include at least one cash dispenser that is selectively operative to dispense currency to users of the ATM. Each ATM also includes at least one processor that is in operative connection with devices of the ATM and that operates in accordance with its programming to enable the ATM to carry out transactions. In the exemplary embodiment the ATMs may operate to provide cash dispensing transactions, check deposit accepting transactions, delivery of digital information transactions, or other types of transactions of the types previously discussed, as well as the check cashing transactions of the type described hereafter.

ATMs 198 and 200 are operatively connected through a network 202 to at least one computer 204. It should be understood that although only one computer 204 is shown, computer 204 may in some embodiments comprise a plurality of servers or other computers. At least one computer 204 is in operative connection with at least one data store 206.

In some exemplary embodiments computer 204 may be remotely located from each ATM and may comprise a financial account computer such as one operated by a bank or other institution that tracks financial accounts for users. For example in some embodiments, at least one computer 204 may be a computer operatively connected to an accounting system that tracks user accounts such as checking accounts, and maintains data related to such accounts, including the balances therein, in the at least one data store 206. In the exemplary embodiment, at least one computer 204 is operative to communicate with ATMs 198, 200 to cause the ATMs to carry out transactions. Of course it should be understood that while only two ATMs are shown, other embodiments may include computers in operative communication with any number of ATMs.

At least one consumer interface device 208 is in operative communication with at least one computer 204. Consumer interface device 208 is operative to provide communications with users of the exemplary system. Specifically, in an exemplary embodiment the consumer interface device 208 is operative to receive communications from account holders whose data is accessible through operation of at least one computer 204. Consumer interface device 208 is also operative to provide communications to such account holders. In addition, the exemplary consumer interface device 208 is also operative to receive inputs from and to provide outputs to persons who may be holding checks for which data has been stored through operation of the at least one computer.

In some exemplary embodiments, consumer interface device 208 may include a telephonic interactive voice response (IVR) device. The IVR device may be operative to receive inputs from users by phone, such as phones connected via land line 210. An IVR device may also be operative to communicate with portable electronic devices such as cell phones or personal digital assistants (PDAs) 212, 214, which wirelessly communicate through a cell phone system schematically indicated 216, or other wireless communications methodologies.

In the exemplary embodiment the telephonic IVR device may be operative to receive inputs from users in the form of telephonic key presses. Software operating in the at least one computer 204 may provide audible outputs in the form of simulated voice outputs to provide users with prompts and outputs through audible messages. Users may then provide key press inputs through phones, PDAs or other devices in response thereto. In other exemplary embodiments, the at least one computer 204 may include voice analysis software. Such voice analysis software may enable users to provide spoken audible inputs that can be interpreted through operation of the at least one computer. The at least one computer may then operate to provide audible outputs to users. Of course these approaches are exemplary.

In other embodiments, the at least one consumer interface device may include a text messaging device. Such a device may provide the capability to communicate text messaging capabilities with cell phones, PDAs or other devices. Alternatively or in addition, the consumer interface device may provide text messaging capabilities through a network 218 with remote computers or other devices 220. In this exemplary embodiment, the consumer interface device may receive inputs in the form of text messages and may provide outputs to users in such form. Of course these approaches are exemplary.

In still other exemplary embodiments, the at least one consumer interface device may be in operative connection with a web interface. Such a web interface may provide communications through a wide area network such as the Internet, or through other public or private networks. Such a web interface may enable the consumer interface device to communicate through HTTP messages and other messages, with remote devices to receive inputs and provide outputs. In some exemplary embodiments, a web interface may enable the consumer interface device 208 to receive messages including image data corresponding to an image of the check. The at least one computer 204 may operate computer programs that enable analysis of such check image data to determine check identifying data, amount data, or other values based on the image data. The at least one computer may analyze check image data generated through a digital camera, schematically indicated 222, which data has been downloaded via personal computer or other device, as well as through camera phones or other image capture devices, to facilitate the carrying out of transactions as later discussed. Of course these approaches are exemplary, and in other embodiments other approaches may be used.

In an exemplary embodiment, an account holder associated with a financial account such as a checking account prepares a check schematically represented by check 224. Check 224 is drawn on the account holder's account. The account holder is alternatively referred to herein as the maker of the check. Check 224 may be a standard bank check in some embodiments, and in other embodiments may be a special check or other type of instrument suitable for use with the particular system.

In an exemplary embodiment, the maker of the check may wish to write the check payable to a person who does not have a checking account. Alternatively, the maker of the check may be writing the check to a person who would prefer to receive cash instead of a check. Further in some cases, the recipient of the check may require the maker to make the check payable to "Cash".

In some situations, such as transaction environments where the recipient has no prior or continuing relationship with the maker of the check, the recipient may be reluctant to accept the check. This is because the check may not be backed by sufficient funds in the account. Further in some cases, the person receiving a check may have a concern that even if there are sufficient funds in a maker's account at the time of receipt of the check, by the time the check is cashed the funds in the account may be depleted so that the check is dishonored.

Some exemplary embodiments can address these issues by assuring a check recipient that the funds represented by the check are available. Further exemplary embodiments may provide that the check recipient can receive cash in exchange for the check without the need for the recipient to have a financial account or for the recipient to personally identify themselves. In an exemplary embodiment, the maker of the check can provide assurance to a check recipient that funds are present by contacting the institution on which the check is drawn. In an exemplary embodiment, the check maker, using a phone or other device, transmits data to the at least one computer 204. In an exemplary embodiment, the maker of the check communicates with the at least one computer through the at least one consumer interface device 208.

In an exemplary embodiment, the maker of the check first communicates, responsive to prompt messages, data which identifies the maker as an authorized user of the system. This can include, for example, providing the user's name, a secret code, certain passwords, other identifying data or combinations thereof. The at least one computer 204 in response to data stored in the at least one data store 206 is operative to identify the maker contacting the system as an authorized account holder who is authorized to use the system.

In the exemplary embodiment, once the computer has verified that the account holder contacting the system is an authorized user, the account holder provides information to the system which identifies the check. This check identifying data may include, for example, data included on the check such as the check number. Alternatively or in addition, the identifying data may include all or a selected portion of the micr line included on the check. In still other embodiments, the user may provide to the computer through the at least one consumer interface, other data which is usable to identify the check. As can be appreciated, the user may provide this information through audible inputs, text inputs, or other inputs as appropriate for the particular type of consumer interface device. Alternatively or in addition in some embodiments, a user may identify the check by providing an image of the check to the at least one consumer interface. This may be done, for example, through a digital picture taken with a camera, a portable phone or other image capture device. Of course this approach is exemplary. Through the at least one consumer interface the maker of the check also provides in the exemplary embodiment, data corresponding to the amount of the check. The maker may provide this input via numerical inputs such as through a phone or computer. In other embodiments, the check value may be included in the image data which corresponds to the visual image of the check.

In exemplary embodiments where image data corresponding to a visual image of the check is presented to the system, at least one computer 204 operates software of the type discussed in connection with other embodiments that is capable of identifying characters included in the image data. In this way the at least one computer 204 is enabled to resolve check identifying data such as micr line data, check number data, or other data. The computer is also enabled to resolve the check amount such as, for example, the courtesy amount and/or legal amount associated with the check. Of course different approaches may be taken in other embodiments.

After receiving check identifying data, the check amount data, as well as other data that may be required by the system, the at least one computer 204 in the exemplary embodiment is operative to determine if the account holder's account has sufficient funds to pay the check. If the at least one computer determines that the funds are not available, the at least one computer operates to notify the account holder through the at least one consumer interface device.

If the account holder has the funds available, the at least one computer in the exemplary embodiment is operative in accordance with its programming to generate certification data. This certification data in the exemplary embodiment comprises a generally unique code. The code may comprise a unique alphanumeric or other type of code which can be used in conjunction with the check to verify that the check is good. The certification data may also be used at an ATM to exchange the check for cash without the bearer of the check having to provide inputs to the machine which personally identify the individual presenting the check, and without the need to have a debit card or other device as may be necessary to operate the ATM for purposes of other transactions. Of course these approaches are exemplary.

In the exemplary embodiment, the at least one computer 204 is also operative at or near the time of outputting the certification data, to cause the funds corresponding to the check amount to be placed on hold and reserved for purposes of paying the check. In this way, a check recipient is assured that the amount of the check will be paid regardless of additional checks which may be drawn on the account after the check is written. In some exemplary embodiments, the at least one computer may operate to transfer the funds to a special account, such as an accrued value account of the type previously described, for the specific purpose of paying the check. In other embodiments the at least one computer may operate to reserve the amount of the check without making an immediate deduction from the account. Of course these approaches are exemplary, and in other embodiments other approaches may be used.

In an exemplary system, the maker of the check provides the certification data along with the check to the check recipient. The check recipient is enabled to verify that the check will be paid when it is presented. This may be accomplished by the person receiving the check contacting the institution or other entity upon which the check is drawn. The check recipient may do this by communicating messages with the at least one computer 204 through the at least one consumer interface device 208. This might be done, for example, via cell phone at the time that the check recipient first receives the check. In an exemplary embodiment, the check recipient may use a cell phone to communicate with the at least one consumer interface device such as a telephone IVR device. The check recipient may provide inputs which identify the check, as well as the certification data. This may be done in response to prompts or other outputs from the consumer interface device. In response to the inputs identifying the check and the certification data, as well as other data that the system may request to be provided by the check recipient, the at least one computer 204 is operative to determine if the check will be honored. The at least one computer makes this determination responsive to the data stored in the data store regarding the check. If the computer determines that the check will not be honored, the check recipient is so informed through the at least one consumer interface. However, if the at least one computer 204 determines that the check will be redeemed for cash, at least one output is provided through the consumer interface device to the check recipient which provides the check recipient assurance that the check will be honored for the check amount.

This exemplary approach provides convenience in transaction situations that are conducted away from electronic devices that are normally used to conduct transactions. For example, a person wishing to purchase an item at a garage sale or a flea market may write a check that the recipient can verify will be honored via cell phone or other remote communication. Likewise, persons passing through a particular area selling crafts, doing odd jobs or other activities not associated with a fixed place of business, may take checks with assurance that the checks will be honored. In some cases the check recipient may receive a check made out to cash which can be cashed in a manner which is generally not traceable back to the check recipient. In exemplary embodiments the approach may enable the paying party to have the benefits of paying by check and the receiving party to have the benefits of receiving payment in cash. Of course these approaches are exemplary.

The recipient of the check may exchange it for cash at an ATM. The exemplary ATMs are programmed to operate so as to enable the ATM to receive the check without having to first input a debit or credit card or other ATM actuating device. Of course this approach is exemplary. Further in some embodiments, a recipient of a check may be able to operate the machine using a debit or credit card and have the check accepted in the course of a deposit transaction to a user's financial account.

In the exemplary embodiment, a check recipient not wishing to be personally identified as cashing the check approaches an ATM, the user provides inputs through at least one input device of the ATM to indicate that they wish to cash a check of the type that has associated certification data. This may be done by providing inputs to the ATM to select a transaction description output on a display or through other methods of providing inputs so as to indicate to the ATM the type of transaction that the user wishes to conduct.

Responsive to operation of at least one processor in the ATM, the ATM is operative to instruct the user to input the check to the ATM and to provide the certification data through at least one input device on the ATM such as a key pad. In an exemplary embodiment, the ATM is operative through operation of the check imaging device to produce image data corresponding to a visual image of the check. This may be done by an imaging device in the manner previously described. The exemplary ATM is then operative responsive to the image data to determine identifying data associated with the check. This may include, for example, data included in the micr line, data included in a check number, or other data on the check. The exemplary ATM is also operative to resolve at least one amount value based on the image data. This amount value may include the courtesy amount, the legal amount, or both.

The exemplary ATM is operative to thereafter communicate with the at least one computer 204. In the exemplary embodiment, the at least one ATM is operative to communicate to the at least one computer, data corresponding to the check identifying data, the certification data, and the amount data. Of course some embodiments may not transmit all of these items, and other embodiments may transmit additional items. Further in still other embodiments, the at least one computer may be operative to transmit data corresponding to the check identifying data and/or the certification data to the ATM such that the ATM can validate the data against what it has received and/or resolved. Further, it should be understood that in exemplary embodiments the data communicated between the ATM and the at least one computer is subject to security procedures such as encryption, transmission through a virtual private network, or other methodologies to maintain the secrecy thereof.

In the exemplary embodiment, the at least one computer 204 remote from the ATM is operative to determine, responsive to the data stored in the at least one data store 206, whether the check data and certification data correspond to data stored in the at least one data store. The at least one computer is also operative to determine if the at least one amount determined by the ATM corresponds to the amount that appears on the check.

In the exemplary embodiment, if the certification data, check identifying data and/or amount associated with the check input at the ATM do not correspond to the data stored in the at least one data store, at least one communication to the ATM indicative thereof is provided by the at least one computer 204. The ATM is operative responsive to such communication to advise the user through at least one output from the ATM. In the exemplary embodiment the check may be returned to the user in circumstances where it does not appear that a fraud is being committed. Of course in some embodiments, if it appears that the user is attempting to perpetrate a fraud, for example if the check is a duplicate of one that has already been redeemed for cash, the at least one ATM may operate in accordance with its programming to capture and store the check in the machine. Of course this approach is exemplary.

If the at least one computer is operative to determine that the data corresponding to the check sent from the ATM corresponds to data for a valid check in the at least one data store 206, the at least one computer communicates to the ATM authorization data indicating that the check should be redeemed for cash. The ATM operates in response to such communication to operate the at least one cash dispenser in the ATM to dispense to the user cash corresponding to the check amount. In an exemplary embodiment the ATM further operates to store the check in the machine.

In the exemplary embodiment, the recipient of the check is enabled to receive cash in exchange for the check without having to provide to input devices on the ATM, data which personally identifies the particular person receiving cash for the check. Thus, for example, in the exemplary embodiment, the user does not have to input a card, biometric input, or other identifying data that can be used to determine the user's identity as a condition to receiving cash in exchange for the check.

It should be understood that in some embodiments ATMs may be in operative connection with cameras such as cameras 226 shown schematically in FIG. 11. These cameras may operate to capture images of persons conducting transactions, for security purposes. However, the images captured by such cameras of ATM users is not considered for purposes of this disclosure to be a required input by a user which identifies the user receiving cash for the particular check. This is because in the exemplary embodiment, in the absence of fraud or other circumstances, image data of users conducting transactions, is stored on a temporary basis and discarded periodically. In this way, in some exemplary embodiments the image of the person who cashed the check which might be used to determine the person's identity, is eventually discarded. In this way, the check recipient may feel comfortable that the receipt and cashing of the check provides the benefits that would otherwise be associated with receiving of cash directly. Of course these approaches are exemplary.

In some embodiments, fees may be imposed on the check maker and/or check recipients for the service. The at least one computer may deduct a fee at the time the certification data is issued and/or a deduction may be made from the amount dispensed to the ATM user.

As can be appreciated, the principles described in connection with the exemplary embodiment may be applied to other systems as well. For example, in the system used in connection with gaming establishments previously described, a system of the type shown in FIG. 11 could be used to determine the value associated with a card, gaming ticket or other item. In such an alternative embodiment, for example, a person having such a card or gaming ticket could provide it to another person. The person receiving such an item could by providing information appearing on the item such as code numbers, symbols or other data, contact at least one computer in operative connection with a database, that includes data that can be used to determine the value associated with the particular item. Communication through a consumer interface device may enable a person considering accepting such a gaming ticket, card or other item to determine the value associated therewith. Further in some embodiments, the recipient of such an item may receive or provide further inputs to the system to help assure that the value associated with the item is not dissipated in some way before the recipient has an opportunity to obtain the benefit thereof. This may be done, for example, by the at least one computer being programmed to issue certification data to the recipient which must be input at an ATM, gaming machine or other device at a later time in order to utilize the particular item. In still other embodiments, the same principles may be applied to cards or other items dispensed from an ATM. A person considering receiving such a card in exchange for value may be able to contact at least one computer through a consumer interface device to verify the card's value. In this way, a person considering giving value in exchange for such a card has greater assurance that the card has the value represented. In other embodiments checks or other items may be exchanged for cash in other transaction environments, such as by a bank teller, check service provider or retail establishment.

Of course these approaches are exemplary, and the principles described may be used in conjunction with other types of systems and devices.

Thus the exemplary systems and methods described herein achieve at least one of the above stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function will be construed as encompassing any means known to those skilled in the art to be capable of performing the recited function, and will not be limited to the structures shown herein or mere equivalents thereof.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

The invention claimed is:

1. A method including operation of an automated banking machine that includes a card reader that operates to read data bearing records including user cards, and to provide cash to a machine user from the machine responsive at least in part to receipt of a financial check by the machine from the machine user, without the machine having received machine user identifying inputs, comprising the steps of:
a) receiving from a machine user through operation of the automated banking machine, a financial check;
b) determining responsive at least in part to operation of a check reading device of the machine, indicia on the financial check received in (a);
c) receiving from the machine user through at least one input device of the machine, at least one input, wherein the at least one input does not include user identifying data;
d) operating the machine to cause a determination to be made that data corresponding to at least some of the indicia determined in (b) and the at least one input received in (c) have a corresponding relationship;
e) responsive at least in part to the determination in (d), causing operation of the machine to dispense cash to the machine user without the machine user having provided machine user identifying inputs to the machine.

2. The method according to claim 1 wherein (b) includes determining from the indicia, check identifying data and an amount associated with the financial check.

3. The method according to claim 2 wherein (c) includes receiving certification data from the machine user.

4. The method according to claim 3 wherein the automated banking machine includes a card reader operative to read data from user cards, and wherein the machine is selectively operative to read data from a user card corresponding to a financial account, dispense cash, and cause the financial account to be assessed for the cash dispensed,
and wherein during (a) through (e) the card reader does not read data from a card of the machine user.

5. The method according to claim 4, wherein the certification data includes a codes and wherein the automated banking machine includes a keypad, and wherein (c) includes receiving the code through the keypad.

6. The method according to claim 4 wherein in (b) the check identifying data determined includes at least one of a check number and data corresponding to at least one character in a micr line on the check.

7. The method according to claim 4 wherein (b) includes generating an electronic image of at least a portion of the check responsive to operation of the check reading device;
and further comprising:
f) operating the machine to send data corresponding to the electronic image of the check to at least one computer located remotely from the machine.

8. The method according to claim 4 wherein (d) includes sending at least some of the check identifying data determined in (b) and data corresponding to the certification data received in (c) from the automated banking machine to a remote computer, wherein the remote computer is located remotely from the machine, and is operative to determine the corresponding relationship.

9. The method according to claim 4 and further comprising:
f) prior to (a), with a financial account computer located remotely from the automated banking machine, receiving from an account holder on whose account the check is drawn, check identifying data corresponding to the financial check and an amount of the financial check.

10. The method according to claim 9 and further comprising:
g) prior to (a), operating the financial account computer to cause the certification data to be provided to the account holder on whose account the financial check is drawn.

11. The method according to claim 10, wherein the financial account computer is in operative connection with the automated banking machine,
wherein in (d) the financial account computer is operative to receive from the automated banking machine, data corresponding to at least some of the check identifying data determined in (b) and the certification data received in (c), and to make the determination, and wherein responsive at least in part to the determination the financial account computer is operative to send at least one message to the automated banking machine;
and wherein the automated banking machine is operative to dispense the cash to the machine user in (e) responsive at least in part to the at least one message sent by the financial account computer.

12. The method according to claim 10 and further comprising:
h) prior to (a), receiving through an interface device in operative connection with the financial account computer, data corresponding to at least some of the check identifying data and the certification data;
i) responsive to (h), determining through operation of the financial account computer that the received check identifying data has the corresponding relationship with to the certification data;
j) responsive at least in part to the determination in (i), causing at least one output through the interface device responsive to operation of the financial account computer, indicative that the check can be exchanged for cash in the amount.

13. The method according to claim 12 wherein in (h) the interface device includes a text message interface.

14. The method according to claim 12 wherein in (h) the interface device includes an interactive voice response (IVR) interface.

15. The method according to claim 12 wherein in (h) the interface device includes a Web interface.

16. The method according to claim 12 wherein in (h) the interface device includes an interface for a mobile phone.

17. The method according to claim 1, wherein the automated banking machine includes a card reader operative to read data from user cards, and wherein the machine is selectively operative to read data from a user card corresponding to a financial account, dispense cash, and cause a financial account to be assessed for the cash dispensed,
and wherein in (a) through (e) the card reader does not read data from a card of the machine user.

18. The method according to claim 1, wherein the automated banking machine includes a keypad, and wherein in (c) the at least one input includes a plurality of manual inputs through the keypad.

19. The method according to claim 1, wherein in (b) the check reading device is operative to generate an electronic image of at least a portion of the check;
and further comprising:
f) operating the automated banking machine to send data corresponding to the electronic image of the check to a computer remotely located from the machine.

20. The method according to claim 1, wherein in (b) the determined indicia includes at least one of a check amount, a check number, and at least one character included in a micr line on the check.

21. The method according to claim 1 and further comprising:
   f) prior to (a), with a financial account computer remote from the automated banking machine, receiving from an account holder on whose account the check is drawn, data corresponding to the amount of the check.

22. The method according to claim 21 and further comprising:
   g) prior to (a), and responsive at least in part to receipt of the check amount data in (f), operating the financial account computer to cause the account holder to receive data corresponding to the at least one input.

23. The method according to claim 21 wherein in (f) the financial account computer receives from the account holder check identifying data, wherein the check identifying data includes at least one of a check number and data corresponding to at least one character in a micr line of the check.

24. The method according to claim 23 wherein in (f) the check amount data is received by the financial account computer through an interface device, wherein the interface device includes a text message interface.

25. The method according to claim 23 wherein in (f) the check amount data is received by the financial account computer through an interface device, wherein the interface device includes a Web interface.

26. The method according to claim 23 wherein in (f) the check amount data is received by the financial account computer through an interface device, wherein the interface device includes an interactive voice response (IVR) interface.

27. The method according to claim 23 wherein in (f) the check amount data is received by the financial account computer through an interface device, wherein the interface device includes an interface with a mobile phone.

28. The method according to claim 1 and further comprising:
   f) prior to (a), receiving through operation of a financial account computer remote from the automated banking machine, data corresponding to at least some of the indicia that will be determined through operation of the machine in (b) and data corresponding to at least one input that will be received by the machine in (c);
   g) prior to (a) and responsive at least in part to the data received in (f), operating the financial account computer to cause at least one output indicative that the financial check may be exchanged for an amount associated with the financial check.

29. The method according to claim 28 wherein the automated banking machine is in operative connection with the financial account computer, and wherein (d) includes making the determination through operation of the financial account computer.

30. The method according to claim 29 wherein in (f) and (g), messages are received and sent respectively, by the financial account computer through an interface device.

31. The method according to claim 30 wherein in (f) and (g), the interface device comprises a text message interface.

32. The method according to claim 30 wherein in (f) and (g), the interface device comprises a web interface.

33. The method according to claim 30 wherein in (f) and (g), the interface device comprises an interface operative to communicate with a mobile phone.

34. At least one article bearing computer executable instructions, wherein the instructions are operative to cause operation of at least one computer in an automated banking machine, wherein the machine operates responsive to data bearing records to provide cash to machine users, wherein the instructions are operative to cause the at least one computer to cause the machine to carry out a method comprising the steps of:
   a) receiving from a machine user through operation of the automated banking machine, a financial check;
   b) determining responsive at least in part to operation of a check reading device of the machine, indicia on the financial check received in (a);
   c) receiving from the machine user through at least one input device of the machine, at least one input, wherein the at least one input is not usable to identify the machine user;
   d) operating the machine to cause a determination to be made that data corresponding to at least some of the indicia determined in (b) and the at least one input received in (c), have a predetermined relationship;
   e) responsive at least in part to the determination in (d), causing operation of the machine to dispense cash from the machine to the machine user without the machine user having provided machine user identifying inputs to the machine.

* * * * *